US006282492B1

(12) United States Patent
Gorai et al.

(10) Patent No.: US 6,282,492 B1
(45) Date of Patent: Aug. 28, 2001

(54) NAVIGATION SYSTEM AND NAVIGATION APPARATUS USED IN THE NAVIGATION SYSTEM

(75) Inventors: Naoki Gorai; Hiroyuki Yamakawa; Takashi Sugawara; Satoshi Kitano; Yasuo Ito, all of Hokkaido (JP)

(73) Assignee: Kabushikikaisha Equos Research (JP)

( * ) Notice: Subject to any disclaimer, the term of this patent is extended or adjusted under 35 U.S.C. 154(b) by 0 days.

(21) Appl. No.: 09/695,255

(22) Filed: Oct. 25, 2000

(30) Foreign Application Priority Data

Oct. 26, 1999 (JP) .................................................. 11-304676

(51) Int. Cl.[7] ............................ G01C 22/00; G01C 21/32
(52) U.S. Cl. .......................... 701/209; 701/210; 701/25; 701/26
(58) Field of Search ................................... 701/209, 210, 701/200, 24, 25, 26, 117, 118, 119; 340/905; 73/178 R

(56) References Cited

U.S. PATENT DOCUMENTS

| 4,812,843 | * | 3/1989 | Champion, III et al. | 340/905 |
|---|---|---|---|---|
| 5,610,821 | | 3/1997 | Gazis et al. | 364/444.2 |
| 5,712,632 | | 1/1998 | Nishimura et al. | 340/995 |
| 5,839,086 | | 11/1998 | Hirano | 701/201 |
| 6,012,012 | * | 1/2000 | Fleck et al. | 701/117 |

FOREIGN PATENT DOCUMENTS

| 7-192196 | 7/1995 | (JP) . |
|---|---|---|
| 10-160497 | 6/1998 | (JP) . |
| WO 99/27323 | 11/1998 | (WO) . |

* cited by examiner

Primary Examiner—William A. Cuchlinski, Jr.
Assistant Examiner—Yonel Beaulieu
(74) Attorney, Agent, or Firm—Lorusso & Loud

(57) ABSTRACT

A navigation system includes a navigation center and a plurality of navigation apparatuses each of which has a data storage that stores various information. In this navigation system, data (coordinate data of each of traveling intersections) concerning a recommended route is transmitted from the navigation center to the navigation apparatus, and then route guidance is carried out in the navigation apparatus using the data received from the navigation center. In the case where the navigation apparatus has intersection data for an intersection specified by the data received from the navigation center, the navigation apparatus extracts the intersection data for the intersection from the data storage. Further, in the case where the navigation center does not have intersection data for an intersection specified by the data received from the navigation center, the navigation apparatus establishes the intersection as a newly-built intersection on the recommended route. Then, the navigation apparatus produces route guidance data (which is used for providing route guidance to a user) using the extracted intersection data, and/or intersection data concerning the established newly-built intersection in addition to the information in the data storage.

26 Claims, 29 Drawing Sheets

Fig. 3

| Block | Intersection Number | Intersection Name | Latitude | Longitude | The Smallest Road Number (A)* | The Smallest Road Number (B)** | Traffic Lights |
|---|---|---|---|---|---|---|---|
| (x,y) | I | KANDA | aaa | nnn | ① | ② | Yes |
| | II | YUSHIMA | aab | nno | ② | ① | Yes |
| (x',y') | III | ○○ | aac | nnp | ④ | ③ | No |
| | IV | △△ | aad | nnq | ⑥ | ⑤ | No |

*The Smallest Road Number (A): This indicates a road number of a road which has the smallest road number in the roads starting from the intersection.

**The Smallest Road Number (B): This indicates a road number of a road which has the smallest road number in the roads coming into the intersection.

Fig. 4

| Road Number | Starting Point (Intersection) | Ending Point (Intersection) | Next Road Number (A)* | Next Road Number (B)** | Road Width | Restricted Road (1) | Restricted Road (2) | Guidance Unnecessary Road | Speed Limit [km/h] | The Number of Nodes | Top Address of Node String Data | Length of Road [m] |
|---|---|---|---|---|---|---|---|---|---|---|---|---|
| ① | I | II | ⑦ | ④ | 1 | -- | -- | ③ | 50 | 15 | 100 | 150 |
| ② | II | I | ③ | ⑧ | 1 | -- | -- | ⑦ | 60 | 13 | 200 | 400 |
| ③ | II | III | ② | ③ | 2 | -- | -- | ⑤ | 50 | 9 | 300 | 100 |
| ④ | III | II | ⑤ | ⑥ | 2 | -- | -- | ② | 40 | 20 | 500 | 80 |
| ⑤ | III | IV | ④ | ⑦ | 2 | ⑥ | -- | ⑧ | 40 | 25 | 600 | 60 |
| ⑥ | IV | II | ⑧ | ① | 1 | ③ | ② | -- | 40 | 30 | 700 | 60 |
| ⑦ | I | IV | ① | ⑤ | 0 | -- | -- | -- | 30 | 9 | 800 | 75 |
| ⑧ | IV | I | ② | ② | 0 | -- | -- | ① | 30 | 3 | 900 | 25 |

*__Next Road Number (A)__: This indicates a road number of a next road (or one of roads) starting from the same starting intersection.

**__Next Road Number (B)__: This indicates a road number of a next road (or one of roads) coming into the same ending intersection.

Fig. 5

| Address | East Longitude | North Latitude | Attribute |
|---|---|---|---|
| | 135.5 | 35.1 | 01 |
| | 135.6 | 35.2 | 01 |
| 100 | | | |
| 200 | | | |

| Intersection Name |
| Intersection Number |
| Turning Angle |
| Distance |
| Intersection Name |
| ⋮ |

(b)

| East Longitude |
| North Latitude |
| Intersection Number |
| Attribute |
| Turning Angle |
| Distance |
| East Longitude |
| ⋮ |

*The navigation apparatus does not have intersection data for the intersection and road data for the roads (indicated by double-lines) respectively indicated by the arrows b1 – b4.*

Matching process can be performed successfully.

NAVIGATION SYSTEM AND NAVIGATION APPARATUS USED IN THE NAVIGATION SYSTEM

BACKGROUND OF THE INVENTION

1. Field of the Invention

The present invention relates to a navigation system and a navigation apparatus used in the navigation system, in which data concerning a recommended route from the current position of the navigation apparatus on a vehicle to the destination thereof is transmitted from a navigation center to the navigation apparatus by means of communications, with the navigation apparatus then providing route guidance for the recommended route to a user using such received data.

2. Description of the Prior Art

At present, navigation apparatuses which provide route guidance for a travel route to a destination to a user are widely used. In these navigation apparatuses, each apparatus is equipped with navigation data such as data related to destinations (targets of guidance), road data for performing a search for a recommended travel route to a destination, and map data for producing display images and the like. Further, each navigation apparatus is provided with a GPS receiver or the like for detecting the current position of the vehicle. In such navigation apparatuses, a recommended route from the current position to the destination is determined using road data, and route guidance along the recommended route is carried out with indicating the current position of the vehicle and the travel directions (going straight or turning left or right etc) on the displayed recommended route.

Further, in addition to the navigation apparatuses described above, a communications navigation system is developed. In this type of navigation apparatus, the current position of the vehicle is detected at the navigation apparatus in the vehicle, while search for a recommended route to the destination is carried out at a separate information center or the like. The navigation apparatus receives the data concerning the recommended route from the information center to perform the route guidance using the received data and the like.

An example of this type of navigation system is disclosed in Japanese Laid-Open Patent Publication No. HEI 10-160497, in which a travel route is determined using recommended route data transmitted from outside the vehicle such as the information center described above. Specifically, in this navigation system, the information center navigation apparatus sends data of a recommended route in the form of a string of link numbers to a navigation apparatus, and then the navigation apparatus converts the received string of link numbers into a string of link numbers for the navigation apparatus, and then a travel route to the destination is established in the navigation apparatus using the string of the converted link numbers.

However, in this navigation system, there is a case that the navigation apparatus receives, as data for a recommended route, a string of link numbers of intersections or roads (e.g., newly constructed intersections or roads) of which data is not stored in the storage medium in the navigation apparatus. In such a case, it is not possible for the navigation apparatus on the vehicle to identify the intersection or road represented by the string of link numbers, which results in a problem in that rout guidance can not be carried out at the navigation apparatus even though the data for the recommended route has been duly received from the information center.

SUMMARY OF THE INVENTION

The present invention has been made in view of the problem described above. Accordingly, it is a main object of the present invention to provide a navigation system and a navigation apparatus used in the navigation system, in which the navigation apparatus can produce route guidance data including intersections and roads corresponding to intersection specified data on a recommended route received from a navigation center or the like, even if the navigation apparatus does not have data corresponding to the intersection specified data.

Further, it is another object of the present invention to provide a navigation system and a navigation apparatus used in the navigation system, in which the navigation apparatus can receive navigation data which is not contained in the storage medium thereof from the navigation center by requesting it to the navigation center.

In view of the objects described above, the present invention is directed to a navigation system which includes a navigation center and a plurality of navigation apparatuses, in which data concerning a recommended route from a current position of each navigation apparatus to a destination is transmitted from the navigation center to the navigation apparatus, and then route guidance is carried out in the navigation apparatus using the data received from the navigation center, wherein the navigation center of the navigation system comprises:

data receiving means for receiving at least data concerning a destination and data concerning a current position of the navigation apparatus from the navigation apparatus using data communications;

a database which stores at least intersection information concerning intersections;

database updating means for updating each information in the database;

recommended route determining means for determining a recommended route from the current position of the navigation apparatus to the destination, the determination of the recommended route being made based on the information in the database in response to a request from the navigation apparatus;

intersection specifying data producing means for specifying intersections located on the determined recommended route based on the intersection information in the database to produce intersection specifying data for said specified intersections; and data transmitting means for transmitting at least the produced intersection specifying data to the navigation apparatus using data communications;

and wherein each navigation apparatus of the navigation system comprises:

data transmitting means for transmitting at least the current position data and the destination data to the navigation center using data communications;

data receiving means for receiving the intersection specifying data from the navigation center using data communications;

data storage means which stores at least intersection information concerning intersections and road information which includes information concerning roads connecting said intersections; and route guidance data producing means for producing route guidance data which is used for providing route guidance for the recommended route to a user of the navigation apparatus, the route guidance data being produced in accordance with the intersection specifying data received from the navigation center and the road information in the data storage means, in which said route guidance data producing means comprises:

(a) specified intersection judging means for judging whether or not intersection data for each of the intersections specified by the intersection specifying data is considered to be contained in the intersection information in the data storage means, respectively;

(b) guide intersection extracting means for, in a case where the specified intersection judging means (a) has judged that intersection data for the intersection specified by the intersection specifying data is considered to be contained in the intersection information in the data storage means, extracting the intersection data for the intersection from the data storage means; and (c) new-intersection establishing means for, in a case where the specified intersection judging means (a) has judged that intersection data for the intersection specified by the intersection specifying data is not contained in the intersection information in the data storage means, establishing the intersection as a newly-built intersection on the recommended route;

wherein the route guidance data producing means of the navigation apparatus is designed so as to produce the route guidance data using the intersection data extracted by said guide intersection extracting means (b), and/or intersection data concerning the newly-built intersection established by said new-intersection establishing means (c) in addition to the road information in the data storage means.

According to the navigation system as described above, the navigation center is designed to transmit to the navigation apparatus intersection specifying data (which contains at least coordinate data of each intersection on the determined recommended route, but does not contain detailed information such as image data of the intersections and the like). Further, in the navigation system of the present invention, in the case where the navigation apparatus does not have intersection data for an intersection specified by the intersection specifying data (because of differences in versions of data and the like), the new-intersection establishing means of the navigation establishes the intersection as a newly-built intersection, and then the route guidance data producing means produces route guidance data without requesting transmission of detailed information for the intersection. In this way, it is possible to reduce the amount of data to be transmitted from the navigation center to the navigation apparatus. Further, it is also possible to shorten the communication time when the navigation center transmits to the navigation apparatus data necessary to perform route guidance in the navigation apparatus.

In the present invention, it is preferred that the intersection specifying data produced by the intersection specifying data producing means contains at least coordinate data of each intersection on the determined recommended route.

Further, in the present invention, it in also preferred that the route guidance data producing means of the navigation apparatus further comprises;

first adjacent-intersections judging means for judging whether or not adjacent two intersections are included in intersections extracted by the guide intersection extracting means (b) of the navigation apparatus; and first road-judging means for, in a case where the first adjacent-intersections judging means has judged that adjacent two intersections are included in the extracted intersections, judging whether or not road data for a road which directly connects said adjacent two intersections is contained in the road information in the data storage means of the navigation apparatus.

In this connection, in a case where the first road-judging means has judged that road data for the road which directly connects the adjacent two intersections is contained in the road information in the data storage means, the route guidance data producing means of the navigation apparatus may produce the route guidance data further using said road data. On the other hand, in a case where the first road-judging means has judged that road data for the road which directly connects the adjacent two intersections is not contained in the road information in the data storage means, the route guidance data producing means of the navigation apparatus may produce the route guidance data by interpolating between said adjacent two intersections.

Further, in the present invention, it is also preferred that the route guidance data producing means of the navigation apparatus further comprises:

second adjacent-intersections judging means for judging whether or not an intersection adjacent to any one of newly-built intersections established by the new-intersection establishing means (c) is included in intersections extracted by the guide intersection extracting means (b) of the navigation apparatus; and second road-judging means for, in a case where the second adjacent-intersections judging means has judged that an intersection adjacent to any one of the newly-built intersections established by the new-intersection establishing means (c) is included in the extracted intersections, judging whether or not road data for a road which directly connects these adjacent two intersections is contained in the road information in the data storage means of the navigation apparatus.

In this connection, in a case where the second road-judging means has judged that road data for the road which directly connects the adjacent two intersections is contained in the road information in the data storage means, the route guidance data producing means of the navigation apparatus may produce the route guidance data further using said road data. On the other hand, in a case where the second road-judging means has judged that road data for the road which directly connects the adjacent two intersections is not contained in the road information in the data storage means, the route guidance data producing means of the navigation apparatus may produce the route guidance data by interpolating between said adjacent two intersections.

Further, in the present invention, it is also preferred that the route guidance data producing means of the navigation apparatus further comprises third adjacent-intersections judging means for judging whether or not adjacent two newly-built intersections are included in newly-built intersections established by the new-intersection establishing means (c) of the navigation apparatus.

In this connection, in a case where the third adjacent-intersections judging means has judged that adjacent two newly-built intersections are included in the established newly-built intersections, the route guidance data producing means of the navigation apparatus may produce the route guidance data by interpolating between said adjacent two newly-built intersections.

Further, in the present invention, it is also preferred that the navigation apparatus further comprises current position measuring means for measuring its current position, the current position measuring means being designed so as to measure the current position by utilizing a global positioning system and/or an inertial navigation system.

Furthermore, in the present invention, it is also preferred that the navigation apparatus further comprises information displaying means for displaying information with which the route guidance is provided to the user of the navigation apparatus.

Moreover, in the present invention, it is also preferred that the navigation apparatus further comprises voice information outputting means for outputting voice information with which the route guidance is provided to the user of the navigation apparatus.

Still further, in the present invention, it is also preferred that both of the navigation center and the navigation apparatus are designed so as to perform the data communications using packet switching technique and/or circuit switching technique.

Still further, in the present invention, it is also preferred that the navigation center is designed so as to send the navigation apparatus additional information as well as the intersection specifying data, in which said additional information contains at least one of:

coordinate data of each of roads connecting the intersections located on the determined recommended route;
data concerning the number of lanes on each of roads connecting the intersections located on the determined recommended route;
data concerning traffic restrictions on each of roads connecting the intersections located on the determined recommended route;
data concerning a geographical layout of each of roads connecting the intersections located on the determined recommended route;
data concerning facilities located around each of the intersections on the determined recommended route;
data showing which intersections in the intersections located on the determined recommended route are provided with traffic lights; and
data for indicating a travelling direction toward which the user of the navigation apparatus is to be guided.

Another aspect of the present invention is directed to a navigation system which includes a navigation center and a plurality of navigation apparatuses, in which data concerning a recommended route from a current position of each navigation apparatus to a destination is transmitted from the navigation center to the navigation apparatus, and then route guidance is carried out in the navigation apparatus using the data received from the navigation center, wherein the navigation center of the navigation system comprises:
  data receiving means for receiving at least data concerning a destination and data concerning a current position of the navigation apparatus from the navigation apparatus using data communications;
  a database which stores at least intersection information concerning intersections;
  database updating means for updating each information in the database;
  recommended route determining means for determining a recommended route from the current position of the navigation apparatus to the destination, the determination of the recommended route being made based on the information in the database in response to a request from the navigation apparatus;
  intersection specifying data producing means for specifying intersections located on the determined recommended route based on the intersection information in the database to produce intersection specifying data for said specified intersections; and
  data transmitting means for transmitting at least the produced intersection specifying data to the navigation apparatus using data communications;

and wherein each navigation apparatus of the navigation system comprises:
  data transmitting means for transmitting at least the current position data and the destination data to the navigation center using data communications;
  data receiving means for receiving the intersection specifying data from the navigation center using data communications;
  data storage means which stores at least intersection information concerning intersections and road information which includes information concerning roads connecting said intersections; and
  route guidance data producing means for producing route guidance data which is used for providing route guidance for the recommended route to a user of the navigation apparatus, the route guidance data being produced in accordance with the intersection specifying data received from the navigation center and the road information in the data storage means, in which said route guidance data producing means comprises:
    (a) specified intersection judging means for judging whether or not intersection data for each of the intersections specified by the intersection specifying data is considered to be contained in the intersection information in the data storage means, respectively;
    (b) guide intersection extracting means for, in a case where the specified intersection judging means (a) has judged that intersection data for the intersection specified by the intersection specifying data is considered to be contained in the intersection information in the data storage means, extracting the intersection data for the intersection from the data storage means; and
    (c) uncontained intersection data request means for, in a case where the specified intersection judging means (a) has judged that intersection data for the intersection specified by the intersection specifying data is not contained in the intersection information in the data storage means, obtaining intersection data for the intersection on the recommended route by requesting the navigation center to send said intersection data to the navigation apparatus;

wherein the route guidance data producing means of the navigation apparatus is designed so as to produce the route guidance data using the intersection data extracted by said guide intersection extracting means (b), and/or the intersection data obtained by the uncontained intersection data request means (c) in addition to the road information in the data storage means.

According to the navigation system as described above, the navigation center is designed to transmit to the navigation apparatus intersection specifying data (which contains at least coordinate data of each intersection on the determined recommended route, but does not contain detailed information such as image data of the intersections and the like). Further, in the navigation system of the present invention, in the case where the navigation apparatus does not have intersection data for an intersection specified by the intersection specifying data (because of differences in versions of data and the like), the uncontained intersection data request means of the navigation apparatus requests transmission of detailed information for the intersection. In this way, since the navigation apparatus requests the navigation center to transmit only data that the navigation apparatus does not have, it is possible to totally reduce the amount of data to be transmitted from the navigation center to the navigation apparatus. Further, it is also possible to totally shorten the communication time when the navigation center transmits to the navigation apparatus data necessary to perform route guidance in the navigation apparatus.

In this invention, it is preferred that the intersection specifying data produced by the intersection specifying data producing means contains at least any one of:
- coordinate data of each intersection on the determined recommended route; and
- data of identification number of each intersection on the determined recommended route.

Further, in this invention, it is also preferred that the route guidance data producing means of the navigation apparatus further comprises:
- first adjacent-intersections judging means for judging whether or not adjacent two intersections are included in intersections extracted by the guide intersection extracting means (b) of the navigation apparatus; and
- road-judging means for, in a case where the first adjacent-intersections judging means has judged that adjacent two intersections are included in the extracted intersections, judging whether or not road data for a road which directly connects said adjacent two intersections is contained in the road information in the data storage means of the navigation apparatus.

In this connection, in a case where the road-judging means has judged that road data for the road which directly connects the adjacent two intersections is contained in the road information in the data storage means, the route guidance data producing means of the navigation apparatus may produce the route guidance data further using said road data. Further, the route guidance data producing means of the navigation apparatus may further comprise uncontained road data request means for, in a case where the road-judging means has judged that road data for the road which directly connects said adjacent two intersections is not contained in the road information in the data storage means, obtaining road data for said road by requesting the navigation center to send said road data to the navigation apparatus, in which the route guidance data producing means of the navigation apparatus produces the route guidance data further using the road data obtained from the navigation center.

Further, in this invention, it is also preferred that the route guidance data producing means of the navigation apparatus further comprises second adjacent-intersections judging means for judging whether or not an intersection adjacent to any one of intersections for which intersection data has been obtained by the uncontained intersection data request means (c) is included in intersections extracted by the guide intersection extracting means (b) of the navigation apparatus.

In this connection, the route guidance data producing means of the navigation apparatus may further comprise uncontained road data request means for, in a case where the second adjacent-intersections judging means has judged that an intersection adjacent to any one of the intersections for which the intersection data has been obtained by the uncontained intersection data request means (c) is included in the extracted intersections, obtaining road data for a road which directly connects these adjacent two intersections by requesting the navigation center to send said road data to the navigation apparatus, in which the route guidance data producing means of the navigation apparatus produces the route guidance data further using the road data obtained from the navigation center.

Further, in this invention, it is also preferred that the route guidance data producing means of the navigation apparatus further comprises third adjacent-intersections judging means for judging whether or not adjacent two intersections are included in intersections for which intersection data is obtained by the uncontained intersection data request means (c) of the navigation apparatus.

In this connection, the route guidance data producing means of the navigation apparatus may further comprise uncontained road data request means for, in a case where the third adjacent-intersections judging means has judged that the adjacent two intersections are included in the intersections for which intersection data is obtained by the uncontained intersection data request means (c), obtaining road data for a road which directly connects these adjacent two intersections by requesting the navigation center to send said road data to the navigation apparatus, in which the route guidance data producing means of the navigation apparatus produces the route guidance data further using the road data obtained from the navigation center.

A third aspect of the present invention is directed to a navigation apparatus used in a navigation system in which data concerning a recommended route from a current position of the navigation apparatus to a destination is transmitted from a navigation center to the navigation apparatus, and then route guidance is carried out in the navigation apparatus using the data received from the navigation center, the navigation center being designed so as to determine the recommended route in response to a request from the navigation apparatus, and to produce intersection specifying data for specifying intersections located on the determined recommended route, the navigation apparatus comprising:
- data transmitting means for transmitting at least data concerning a current position of the navigation apparatus and data concerning a destination to the navigation center using data communications;
- data receiving means for receiving at least the intersection specifying data from the navigation center using data communications;
- data storage means which stores at least intersection information concerning intersections and road information which includes information concerning roads connecting said intersections; and
- route guidance data producing means for producing route guidance data which is used for providing route guidance for the recommended route to a user of the navigation apparatus, the route guidance data being produced in accordance with the intersection specifying data received from the navigation center and the road information in the data storage means, in which said route guidance data producing means comprises:
  - (a) specified intersection judging means for judging whether or not intersection data for each of the intersections specified by the intersection specifying data is considered to be contained in the intersection information in the data storage means, respectively;
  - (b) guide intersection extracting means for, in a case where the specified intersection judging means (a) has judged that intersection data for the intersection specified by the intersection specifying data is considered to be contained in the intersection information in the data storage means, extracting the intersection data for the intersection from the data storage means; and
  - (c) new-intersection establishing means for, in a case where the specified intersection judging means (a) has judged that intersection data for the intersection specified by the intersection specifying data is not contained in the intersection information in the data storage means, establishing the intersection as a newly-built intersection on the recommended route;

wherein the route guidance data producing means is designed so as to produce the route guidance data using the intersection data extracted by said guide intersection extracting means (b), and/or intersection data concerning the newly-built intersection established by said new-intersection establishing means (c) in addition to the road information in the data storage means.

The other aspect of the present invention is directed to a navigation apparatus used in a navigation system in which data concerning a recommended route from a current position of the navigation apparatus to a destination is transmitted from a navigation center to the navigation apparatus, and then route guidance is carried out in the navigation apparatus using the data received from the navigation center, the navigation center being designed so as to determine the recommended route in response to a request from the navigation apparatus, and to produce intersection specifying data for specifying intersections located on the determined recommended route, the navigation apparatus comprising:

data transmitting means for transmitting at least data concerning a current position of the navigation apparatus and data concerning a destination to the navigation center using data communications;

data receiving means for receiving at least the intersection specifying data from the navigation center using data communications;

data storage means which stores at least intersection information concerning intersections and road information which includes information concerning roads connecting said intersections; and route guidance data producing means for producing route guidance data which is used for providing route guidance for the recommended route to a user of the navigation apparatus, the route guidance data being produced in accordance with the intersection specifying data received from the navigation center and the road information in the data storage means, in which said route guidance data producing means comprises:
(a) specified intersection judging means for judging whether or not intersection data for each of the intersections specified by the intersection specifying data is considered to be contained in the intersection information in the data storage means, respectively;
(b) guide intersection extracting means for, in a case where the specified intersection judging means (a) has judged that intersection data for the intersection specified by the intersection specifying data is considered to be contained in the intersection information in the data storage means, extracting the intersection data for the intersection from the data storage means; and
(c) uncontained intersection data request means for, in a case where the specified intersection judging means (a) has judged that intersection data for the intersection specified by the intersection specifying data is not contained in the intersection information in the data storage means, obtaining the intersection data for the intersection on the recommended route by requesting the navigation center to send the intersection data to the navigation apparatus;

wherein the route guidance data producing means is designed so as to produce the route guidance data using the intersection data extracted by said guide intersection extracting means (b), and/or the intersection data obtained by the uncontained intersection data request means (c) in addition to the road information in the data storage means.

The above described and other objects, structures and advantages of the present invention will be apparent when the following description of the preferred embodiments will be considered in conjunction with the appended drawings.

BRIEF DESCRIPTION OF THE DRAWINGS

FIG. 3 is a table which shows contents of an intersection data file for the road network of FIG. 2, which is stored in both a navigation apparatus and a navigation center of the navigation system;

FIG. 4 is a table which shows contents of a road data file for the road network of FIG. 2, which is stored in both the navigation apparatus and navigation center of the navigation system.

FIG. 5 is a table which shows contents of a node data file which is stored in both the navigation apparatus and navigation center of the navigation system;

FIG. 6 shows contents of recommended route data which is produced through the recommended route determining process carried out in the navigation center of the navigation system, in which FIG. 6(a) shows a string of intersection data, and FIG. 6(b) shows a string of node data;

DETAILED DESCRIPTION OF PREFERRED EMBODIMENTS

Figure 1:
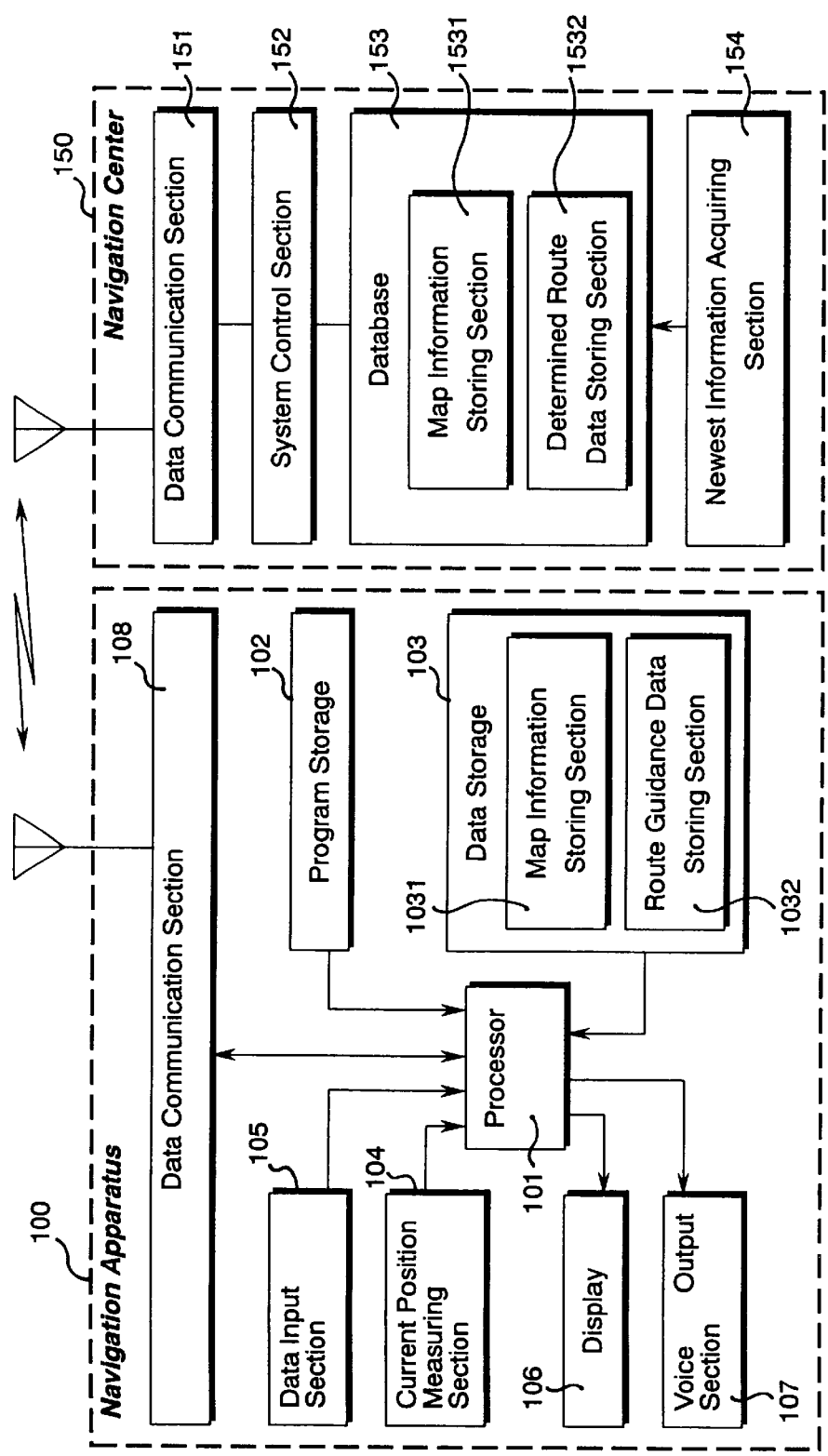
FIG. 1 is a block diagram which shows an overall structure of a navigation system according to the present invention.

First, in the following items (1)–(4), a general description of first embodiment of a navigation system according to the present invention is given.

(1) General Structure of First Embodiment of Navigation System

The navigation system according to the present invention includes a navigation center (center apparatus) and a plurality of navigation apparatuses.

The navigation center of the navigation system includes data receiving means for receiving at least data concerning a destination and data concerning a current position of the navigation apparatus from the navigation apparatus using data communications; a database which stores at least intersection information concerning intersections; database updating means for updating each information in the database; recommended route determining means for determining a recommended route from the current position of the navigation apparatus to the destination; intersection specifying data producing means for specifying intersections located on the determined recommended route based on the intersection information in the database to produce intersection specifying data for the specified intersections; and data transmitting means for transmitting at least the produced intersection specifying data to the navigation apparatus using data communications. In this navigation center, the determination of the recommended route by the recommended route determining means is made based on the information in the database in response to a request from the navigation apparatus. Further, the intersection specifying data produced by the intersection specifying data producing means contains at least coordinate data of each intersection on the determined recommended route.

Each navigation apparatus of the navigation system includes data transmitting means for transmitting at least the current position data and the destination data to the navigation center using data communications; data receiving means for receiving the intersection specifying data from the navigation center using data communications; data storage means which stores at least intersection information concerning intersections and road information which includes information concerning roads connecting the intersections; and route guidance data producing means for producing route guidance data which is used for providing route guidance for the recommended route to a user of the navigation apparatus. In this navigation apparatus, the route guidance data producing means produces the route guidance data in accordance with the intersection specifying data received from the navigation center and the road information in the data storage means.

(2) General Structure of Route Guidance Data Producing Means of Navigation Apparatus In the navigation apparatus described above, the route guidance data producing means includes the following means (a)–(c).

(a) Specified intersection judging means for judging whether or not intersection data for each of the intersections specified by the intersection specifying data is considered to be contained in the intersection information in the data storage means, respectively. (This means corresponds to Steps S10–S24, Step S34, and Step S36 in FIG. 14, which will be described later.)

(b) Guide intersection extracting means for, in the case where the specified intersection judging means (a) has judged that intersection data for the intersection specified by the intersection specifying data is considered to be contained in the intersection information in the data storage means, extracting the intersection data for the intersection from the data storage means. (This means corresponds to Step S26 in FIG. 14, which will be described later.)

(c) New-intersection establishing means for, in the case where the specified intersection judging means (a) has judged that intersection data for the intersection specified by the intersection specifying data is not contained in the intersection information in the data storage means, establishing the intersection as a newly-built intersection on the recommended route. (This means corresponds to Step S30 in FIG. 14, which will be described later.)

In this connection, the route guidance data producing means described above is designed so as to produce the route guidance data using the intersection data extracted by the guide intersection extracting means (b), and/or intersection data concerning the newly-built intersection established by the new-intersection establishing means (c) in addition to the road information in the data storage means.

In addition to the means (a), (b) and (c) described above, the route guidance data producing means further includes first adjacent-intersections judging means for judging whether or not adjacent two intersections are included in intersections extracted by the guide intersection extracting means of the navigation apparatus; and first road-judging means for, in the case where the first adjacent-intersections judging means has judged that adjacent two intersections are included in the extracted intersections, judging whether or not road data for a road which directly connects the adjacent two intersections is contained in the road information in the data storage means of the navigation apparatus. In this connection, the first adjacent-intersections judging means corresponds to Step S40 in FIG. 15, and the first road-judging means corresponds to Step S44 in FIG. 15, which wvii be described later.

Further, the route guidance data producing means includes second adjacent-intersections judging means for judging whether or not an intersection adjacent to any one of newly-built intersections established by the new-intersection establishing means is included in intersections extracted by the guide intersection extracting means of the navigation apparatus and second road-judging means for, in the case where the second adjacent-intersections judging means has judged that an intersection adjacent to any one of the newly-built intersections established by the new-intersection establishing means is included in the extracted intersections, judging whether or not road data for a road which directly connects these adjacent two intersections is contained in the road information in the data storage means of the navigation apparatus. In this connection, the second adjacent-intersections judging means corresponds to Step S60 in FIG. 16A, and the second road-judging means corresponds to each of Steps S80 and S82 in FIG. 16B, which will be described later.

Furthermore, the route guidance data producing means includes third adjacent-intersections judging means for judging whether or not adjacent two newly-built intersections are included in newly-built intersections established by the new-intersection establishing means of the navigation apparatus. In this connection, the third adjacent-intersections judging means corresponds to Step S60 in FIG. 16A, which will be described later.

(3) Summary of Operations Performed in First Embodiment of Navigation System

In the case where the first road-judging means has judged that road data for the road which directly connects the adjacent two intersections in contained in the road information in the data storage means, the route guidance data producing means of the navigation apparatus produces the route guidance data further using the road data. This operation will be described later in more detail with reference to FIG. 18.

Further, in the case where the first road-judging means has judged that road data for the road which directly connects the adjacent two intersections is not contained in the road information in the data storage means, the route guidance data producing means of the navigation apparatus produces the route guidance data by interpolating between the adjacent two intersections. This operation will be described later in more detail with reference to FIG. 22.

Furthermore, in the case where the second road-judging means has judged that road data for the road which directly connects the adjacent two intersections is contained in the road information in the data storage means, the route guidance data producing means of the navigation apparatus produces the route guidance data further using the road data. This operation will be described later in more detail with reference to FIG. 19.

Moreover, in the case where the second road-judging means has judged that road data for the road which directly connects the adjacent two intersections is not contained in the road information in the data storage means, the route guidance data producing means of the navigation apparatus produces the route guidance data by interpolating between the adjacent two intersections. This operation will be described later in more detail with reference to FIGS. 20 and 21.

Still further, in the case where the third adjacent-intersections judging means has judged that adjacent two newly-built intersections are included in the established newly-built intersections, the route guidance data producing means of the navigation apparatus produces the route guidance data by interpolating between the adjacent two newly-built intersections. This operation will be described later in more detail with reference to FIG. 23.

(4) Summary of Effects Achieved by Navigation System

With the navigation apparatus of the present invention described above, even in the case where data of the intersections and roads corresponding to travel intersections (i.e., intersections specified by the intersection specified data) received from the navigation center do not exist in the road network data in the navigation apparatus, the travel route can be identified by considering such intersections and roads as newly established intersections and newly established roads. In this way, even when there is a difference between the road network data in the navigation center and the road network data in the navigation apparatus, route guidance can be carried out at the navigation apparatus.

Further, in the present embodiment, because the travel route can be identified for route guidance only using the coordinates data of the travel intersections received from the navigation center, it becomes possible to reduce the communication time and communication cost required for the data transmission from the information center to the navigation apparatus.

Moreover, in the present invention, the navigation center has the newest road network data, since the road network data in the navigation center is updated every time a new intersection or road to constructed. In contrast, in the storage medium such as CD-ROM used in the navigation apparatus, such newly information is normally incorporated thereinto when updated into a newer version. Further, depending on the kinds of the storage medium, there are cases that no new version is manufactured and sold. As a result, there are many cases where there is a difference between the road network data in the information center and the road network data in an individual navigation apparatus. However, according to the present invention, regardless of the difference in the road network data, it is always possible to identify the travel route based on the intersection specified data received from the navigation center even if the navigation apparatus does not have the corresponding intersection data, and route guidance can be carried out along the travel route.

(5) Detailed Structure of First Embodiment of the Navigation System of the Present Invention FIG. 1 shows a schematic view of the structure of the navigation system according to the present invention.

This navigation system includes a navigation apparatus 100 mounted on a moving body such as a vehicle and a navigation center (center apparatus) 150 which communicates with each of a plurality of navigation apparatuses 100.

Each of the navigation apparatuses 100 includes a processor (which act as route guidance data producing means) 101, a program storage 102, a data storage (data storage means) 103, a current position measuring section (current position measuring means) 104, a data input section (data input means) 105, a display (information displaying means)

106, a voice output section (voice information outputting means) 107, and a data communication section (which includes data transmitting means and data receiving means) 108.

The navigation center 150 includes a data communication section (which includes data transmitting means and data receiving means) 151, a system control section (which includes recommended route determining means and intersection specifying data producing means) 152, a database 153, and a newest information acquiring section (database updating means) 154.

In the navigation apparatus 100, the processor 101 is equipped with a CPU which carries out various processes such as a request process for sending a destination data and a transmission request for intersection specifying data to the navigation center 150; a matching process for judging whether or not intersection data for an intersection specified by the received intersection specifying data is contained (or is considered to be contained) in information stored in the navigation apparatus (FIG. 14); a process for determining a road connecting travelling intersections (FIG. 15); a process for determining a road connected to a newly-built intersection (FIG. 16A and 16B); a process for interpolating between travelling intersections (FIG. 17); a route guidance process; and a recommended route determining process which is carried out independently in the navigation apparatus. In this connection, it should be noted that the term "travelling intersection" in the present invention refers to an intersection which is located on the determined recommended route and which is to be traveled by the vehicle.

The program storage 102 is formed from a storage medium such as a ROM and the like. This program storage 102 stores various programs and data required by the processor 101 in order to carry out the processes described above.

The data storage 103 is formed from a storage medium such as a RAM, CD-ROM, flash memory, DVD-ROM, hard DISA and the like. This data storage 103 includes a map information storing section 1031, a route guidance data storing section 1032 and other storage sections.

The map information storing section 1031 of the data storage 103 is formed from a large capacity storage medium such as a CD-ROM, DVD-ROM, hard disk and the like. This map information storing section 1031 stores road network data, in which the road network data contains intersection data stored in an intersection data file, road data stored in a road data file, and node data stored in a node data file.

Figure 2:
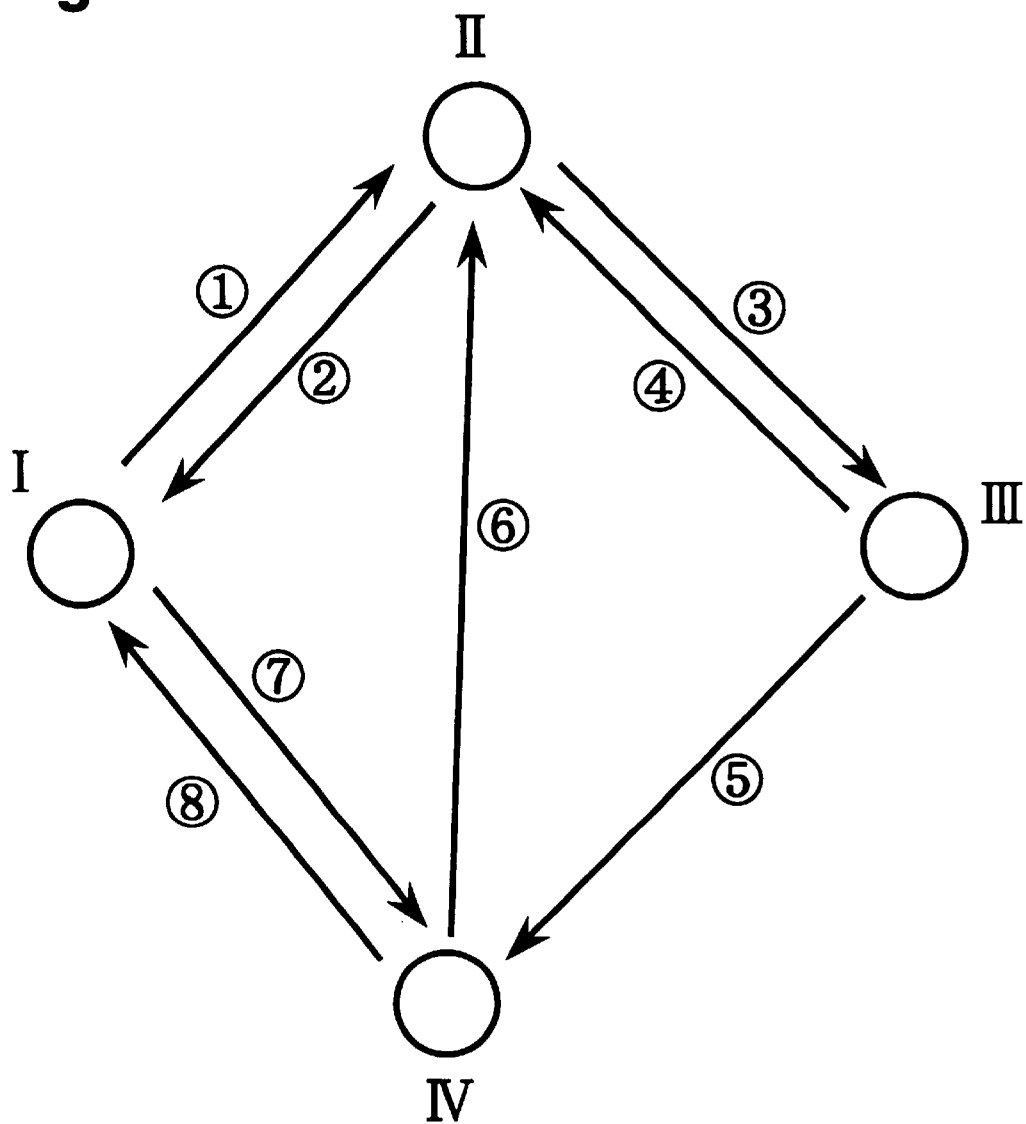
FIG. 2 is an illustration which shows an example of a road network.

FIG. 2 shows an example of a road network.

Hereinafter, based on the road network comprised of the intersections I–IV and the roads 1–8 shown in FIG. 2, a description will be given for each of the files stored in the map information storing section 1031.

FIG. 3 shows the contents of the intersection data file for the road network of FIG. 2.

As shown in FIG. 3, the intersection data file stores data concerning intersections contained in the road network. The road network is divided into a number of regions (geographic districts), and the intersection data file is also divided into a number of blocks so as to correspond to the respective regions, so that data concerning intersections in each region is stored for each corresponding block. In this regard, each region is formed into a square shape having an appropriate size. Further, each region is specified by both head coordinates (x, y) and (x', y') on a diagonal line of each square shape. By constructing the intersection data file in this way, the number of intersections which are to be retrieved when a matching process for the specified traveling intersection is carried out can be reduced, as compared with the case where intersections throughout the entire country are to be retrieved, thus making it possible to carry out the matching process efficiently.

As shown in FIG. 3, in the intersection data file, for each of the Intersections I–IV, the intersection name, the longitude and latitude of the intersection, the road number of the road that has the smallest road number in the roads starting from the intersection (which is shown in the column "The Smallest Road Number (A)" in FIG. 3), the road number of the road that has the smallest road number in the roads coming into the intersection (which is shown in the column "The Smallest Road Number (B)" in FIG. 3), and information indicating whether traffic lights are present or absent at the intersection are stored.

FIG. 4 shows the contents of the road data file for the road network of FIG. 2.

As shown in FIG. 4, in the road data file, for each of Roads 1–8, the starting point intersection number, the ending point intersection number, the road number of the next road (one of the roads) starting from the same starting point (which is shown in the column "Next Road Number (A)" in FIG. 4), the road number of the next road (one of the roads) coming into the same ending point (which is shown in the column "Next Road Number (B)" in FIG. 4), the road width, the restricted road number, information indicating a part of the route where there is no need for guidance, the speed limit, the number of nodes, the top address of the node string data, and the length of the road are stored.

FIG. 5 shows the contents of the node data file.

As shown in FIG. 5, the node data file stores node data formed from information related to pedestrian crossings, tunnels and the like. Further, data such as the east longitude, north latitude, attributes and the like of each node are stored in the node data file. As is seen from the road data, each road is represented by these nodes. Namely, the node data of one node represents one place on the road, and if a path between the adjacent nodes is referred to as an "arc", the road can be represented by connecting the nodes which are formed from the road strings with arcs.

For example, in the case of Road 1, from the road data shown in FIG. 4, it is possible to understand that Road 1 is represented by 15 nodes, and that the top address of the node string data is 100. This means Road 1 is represented by the node data starting from Address 100 to Address 114.

The route guidance data storing section 1032 of the data storage 103 is allocated in a predetermined area in the RAM. In this route guidance data storing section 1032, navigation data for the recommended route is to be stored. The navigation data is formed from data of intersections and roads identified in the map information stored in the map information storing section 1031. The data of the intersection and road is produced based on the intersection specifying data received from the navigation center 150 as described hereinbelow in detail. Further, this RAM can also be used as a so-called working space for running the various programs, and for reading and writing data needed when data communications are carried out with the navigation center 150.

The current position measuring section 104 utilizes either a GPS (Global Positioning System) or a self-contained navigation system (such as an inertial navigation system, a dead-reckoning navigation system, and the like) to measure the current position of the vehicle (on which the navigation apparatus 100 is mounted). Namely, the current position measuring section 104 is equipped with a GPS receiver which measures the absolute position of the vehicle using signals received from a plurality of GPS satellites, a speed sensor for measuring the relative position of the vehicle, a gyro sensor, a bearing (azimuth) sensor, and the like. In this regard, the relative position which is measured using the speed sensor and the gyro sensor is used to know the position of the vehicle when the GPS receiver cannot receive signals from the GPS satellites (e.g., when the vehicle is passing through a tunnel). Further, the relative position can also be used to correct measurement errors of the absolute position measured using the GPS receiver.

The data input portion 105 may be provided with various input devices such as a touch panel provided on the screen of the display 106, a joystick, and an information input device which utilizes a voice recognition device. In the case of the touch panel, a user uses a finger to touch icons displayed on the display 106 to input necessary information and commands. Further, in the case of the information input device utilizing the voice recognition device, when the user speaks predetermined commands, the commands are recognized by the voice recognition device, and then they are inputted.

Various displays such as a liquid crystal display, CRT and the like may be used for the display 106. According to such a display, it is possible to display various images such as icons as well as road maps and detailed intersection maps.

The voice output section 107 is equipped with an audio synthesizer and a speaker. When route guidance is carried out, a guidance voice is synthesized to output voice instructions (e.g., "Turn right at the intersection 110 m ahead.") from the speaker. In this regard, the synthesized guidance voice may be outputted from the vehicle-mounted audio speakers. Further, the synthesized guidance voice may also be outputted from a separate exclusive-use speaker arranged above the driver's seat or on the upper central portion of the front windshield.

The data communication section 108 is provided with a modem and a wireless communication device such as a portable phone, PHS or the like connected to such a modem. This data communication section 108 enables the navigation apparatus 100 to carry out voice communications (telephone calls) and data communications (e.g., transmission of current position data and destination data, reception of intersection specifying data) with the navigation center 150.

On the other hand, the data communication section 151 of the navigation center 150 is provided with communication apparatuses such as a modem, a terminal adapter, a router and the like. This data communication section 151 establishes communications (i.e., communications by PHS, portable phone or other wireless communication means) with the navigation apparatus 100.

The system control section 152 is constructed from a computer system equipped with a CPU, a ROM, a RAM and other devices (not shown in the drawings).

The CPU controls the entire system in accordance with various programs stored in memory means which includes the ROM. Further, upon receiving the current position data and the destination data transmitted from the navigation apparatus 100 the CPU carries out the various processes required at the navigation center 150. Such processes include a recommended route determining process for determining a recommended route from the current position to the destination; a traveling intersection extraction process for extracting intersections which are located on the determined recommended route and which are to be traveled by the vehicle; an intersection specifying data transmitting process for transmitting intersection specifying data (i.e., a string of coordinate data of traveling intersections) to the navigation apparatus 100; an information updating process for updating the database 153 (map information storage section 1531); and other required processes.

The ROM stores the programs and data required by the CPU for executing these various processes.

The RAM is used as a so-called working space for reading and writing various data when the CPU is running various programs.

The database 153 includes the map information storing section 1531, the determined route data storing section 1532, and a newest information storing section in which newest information acquired (collected) by the newest information acquiring section 154 is stored.

Examples of such newest information, which is acquired by the newest information acquiring section 154 and then stored in the newest information storing section, include traffic congestion information (the location and length of congestion, the degree of congestion); construction information (construction section, construction time, term of construction work); traffic accident information (the location of accident, the degree of accident, whether or not traffic flow is possible, estimated time required for clearing the accident) and the like. All of such information is used in the recommended route determining process carried out in the navigation center 150. Further, the newest information acquiring section 154 also collects and acquires road data concerning newly-built roads, intersection data concerning newly-built intersections, and data concerning changes in the state of roads regarding prohibitions against going through a road or turning left or right on a road. The map information storing section 1531 is updated based on all the data.

The map information storing section 1531 includes a large capacity storage medium such as a CD-ROM, DVD-ROM, hard disk and the like. This map information storing section 1531 stores road network data of road network for the entire country. The road network data is constructed from intersection data stored in an intersection data file, road data stored in a road data file, and node data stored in a node data file.

Except for the following differences, the intersection data file, the road data file and the node data file in the map information storing section 1531 respectively store the same data that stored in the respective files in the map information storing section 1031 of the navigation apparatus 100 shown in FIGS. 3–5.

Namely, because each file of the map information storing section 1531 is periodically updated to have the newest information as described above, the map information storing section 1531 of the navigation center 150 can have new data which is not stored in the map information storing section 1031 of the navigation apparatus 100.

Further, as described above, in the navigation apparatus 100, the intersection data file is divided into a number of blocks in order to efficiently carry out a matching process for each traveling intersection. With this contrast, because there is no need for the navigation center 150 to carry out such a matching process, the intersection data file in the navigation center 150 is not divided into a number of blocks. However, the intersection data file in the navigation center 150 may be divided into blocks in the same manner as shown in FIG. 3, and then a block identification number for specifying the block that includes traveling intersections may be transmitted together with the intersection specifying data to the navigation apparatus 100.

Further, the node data file in the map information storing section 1531 stores the same data as shown in FIG. 5. In this regard, it is to be noted that such node data file may be omitted from the map information storing section 1531 of the navigation center 150, because the determined recommended route does not necessarily need to be displayed at the navigation center 150.

On the other hand, a storage medium such as a RAM or the like can be used for the determined route data storing section 1532.

FIG. 6 shows the contents of the determined recommended route data which is produced through the recommended route determining process.

This recommended route data contains a string of intersection data (FIG. 6(*a*)) and a string of node data (FIG. 6(*b*)). As shown in FIG. 6(*a*), each intersection data in the intersection data string contains information such as the intersection name, intersection number, turning angle, distance and the like. Further, as shown in FIG. 6(*b*), each node data in the node data string contains information such as the node coordinates (east longitude and north latitude) for representing the node position intersection number, attribute, angle, distance and the like.

In this connection, the intersections located on the determined recommended route is specified based on the intersection data string as shown in FIG. 6(*a*), and then intersection specifying data which contains intersection coordinates of the specified intersections (traveling intersections) is produced based on the node data shown in FIG. 6(*b*) in the navigation center 150. Then, thus produced intersection specifying data is transmitted to the navigation apparatus 100 via the data communication section 150.

Now, in the case where a recommended route determining process is carried out independently in the navigation apparatus 100, determined recommended route data formed from a string of intersection data such as shown in FIG. 6 (*a*) and a string of node data such as shown in FIG. 6 (*b*) is used in the navigation apparatus 100.

Next, the operations carried out in the navigation apparatus 100 and the navigation center 150 will be described.

Figure 7:
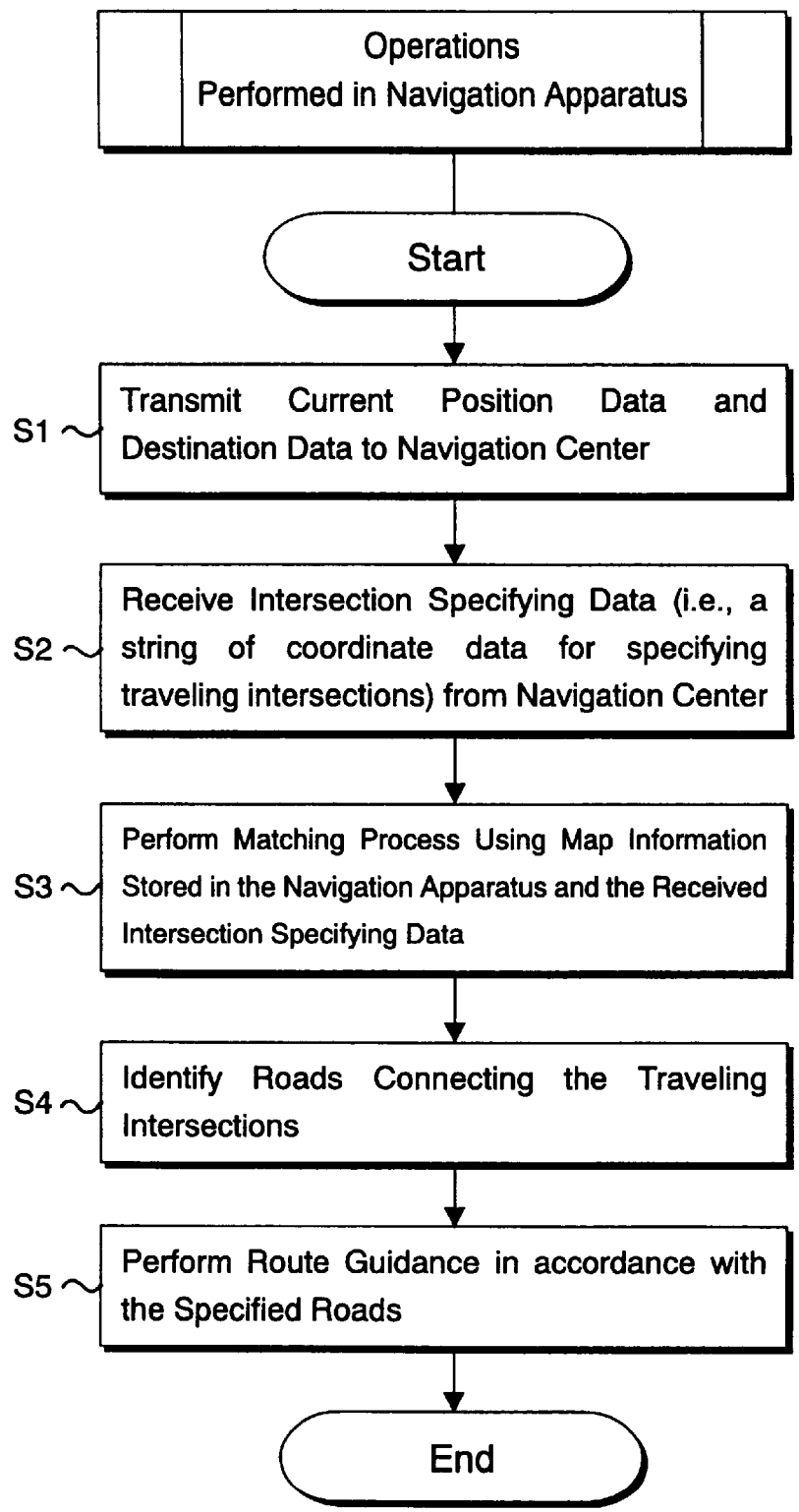
FIG. 7 is a flowchart which generally shows operations performed in the navigation apparatus.

FIG. 7 is a flowchart which shows the operations carried out in the navigation apparatus 100.

First, the processor 101 obtains the destination data inputted by the user and the current position data (departure point data) of the vehicle measured by the current position measuring section 104, and then transmits each information to the navigation center 150 via the data communication section 108 (Step S1). In this regard, the packet switching technique is utilized for the data communications carried out between the navigation apparatus 100 and the navigation center 150, but circuit switching technique may also be utilized.

Then, intersection specifying data (which contains a string of coordinate data of each traveling intersection) transmitted from the navigation center 150 is received by the processor 101 of the navigation apparatus 100 via the data communication section 108, and then the intersection specifying data is stored in a predetermined area of the RAM (Step S2).

Next, the processor 101 performs a matching process using map information stored in the navigation apparatus 100 and the intersection specifying data received from the navigation center 150 (Step S3). Specifically, such a matching process is carried out by judging whether or not intersection data for a traveling intersection specified by the received intersection specifying data is contained (or is considered to be contained) in the map information stored in the navigation apparatus 100. (This judgment is made for each of intersections specified by the received intersection specifying data.) Then, in the case where it is judged that intersection data for the traveling intersection specified by the intersection specifying data is contained (or is considered to be contained) in the map information, the processor 101 extracts this intersection data for the traveling intersection from the map information in the map information storing means 1031. On the other hand, in the case where it is judged that intersection data for the traveling intersection specified by the intersection specifying data is not contained nor considered to be contained in the map information, the processor 101 establishes the intersection as a newly-built intersection.

Further, the processor 101 identifies roads connecting the traveling intersections (Step S4), and then carries out route guidance in accordance with the identified traveling intersections and roads (Step S5). After the route guidance has been completed, the process is ended.

Next, the operations carried out in the navigation center 150 will be described.

Figure 8:
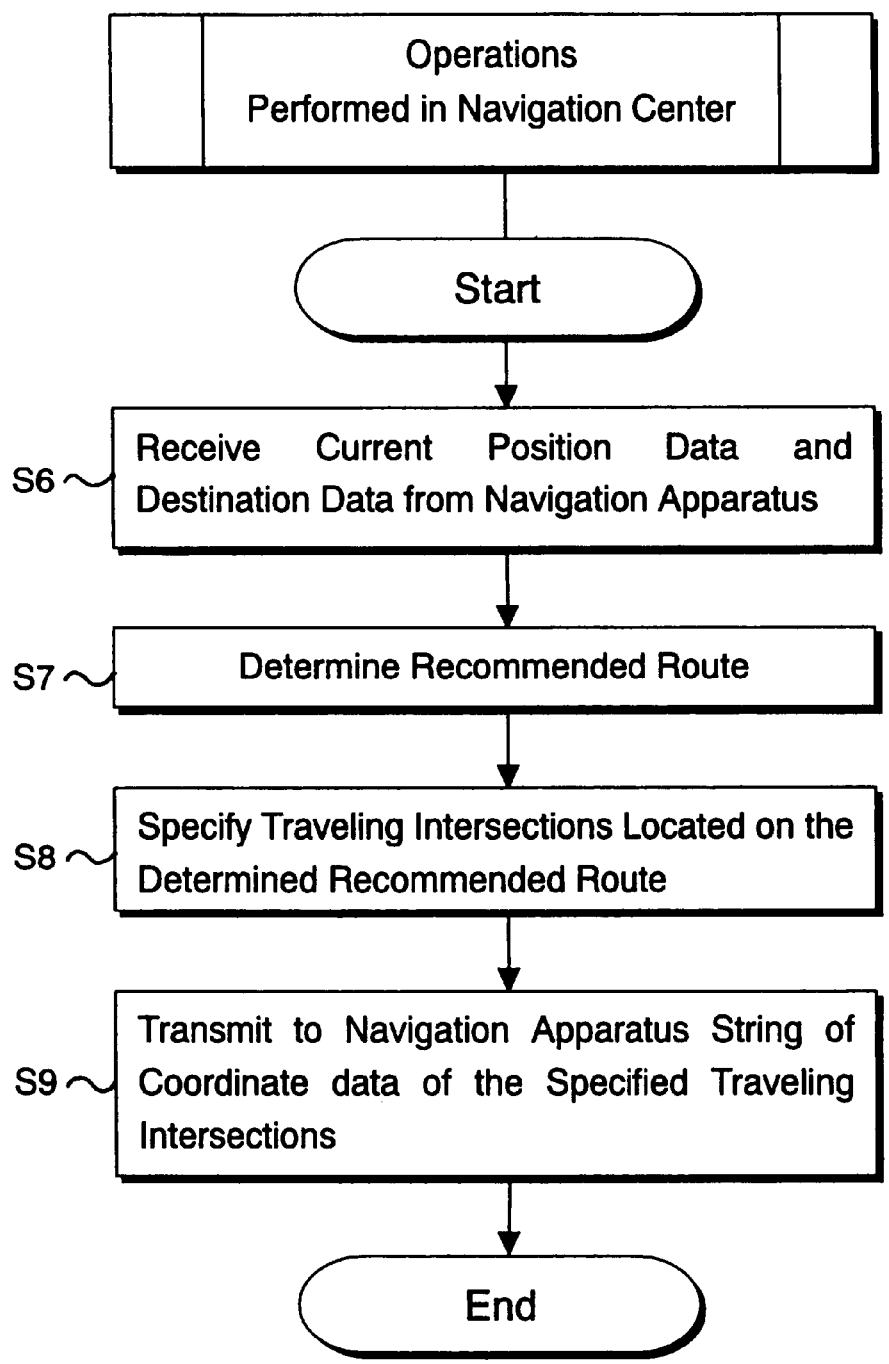
FIG. 8 is a flowchart which generally shows operations performed in the navigation center.

FIG. 8 is a flowchart which shows the route search and route transmission process carried out in the navigation center 150.

First, the destination data and the departure point data transmitted from the navigation apparatus 100 are received by the system control section 152 of the navigation center 150 via the data communication section 151 (Step S6).

Then, the system control section 152 determines (computes) a recommended route from the departure point to the destination based on the intersection data, node data and road data in the map information storing section 1531 (Step S7). This recommended route determining process can be carried out using various known methods, such as the methods disclosed in Japanese Laid-Open Patent Application Nos. HEI 1-173297 and HEI 1-173298.

In such a recommended route determining process, the distance between intersections is mainly taken into consideration to determine a recommended route. Further, in this embodiment, traffic information (e .g., congestion information) acquired by the newest information acquiring section 154 is also taken into consideration to determine a recommended route having the shortest distance. The determined recommended route data is stored in the RAM.

Next, the system control section 152 specifies traveling intersections located on the determined recommended route based on a string of intersection data (FIG. 6(*a*)) contained in the determined recommended route data (Step S8). Then, the system control section 152 produces a string of coordinate data of each of the specified traveling intersections (that is, intersection specifying data) based on the node data shown in FIG. 6(*b*), and then the system control section 152 transmits to the navigation apparatus 100 via the data communication section 151 (Step S9). After the transmission of the intersection specifying data, the process is ended.

Next, a detailed description of the main operations carried out in the navigation apparatus 100 and in the navigation center 150 will be given.

Figure 9:
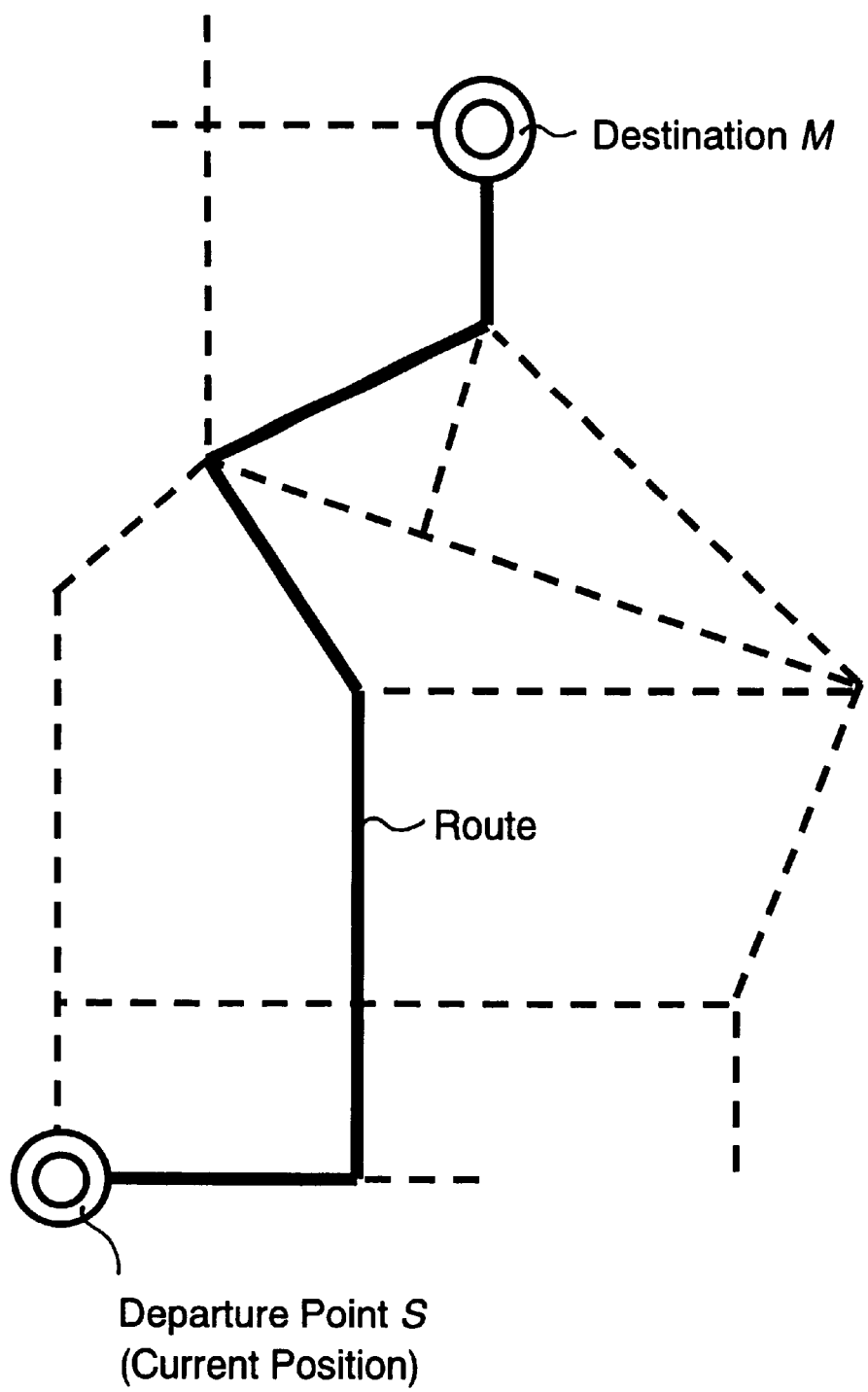
FIG. 9 is an illustration which schematically shows an example of a recommended route determined in the navigation center.
Figure 10:
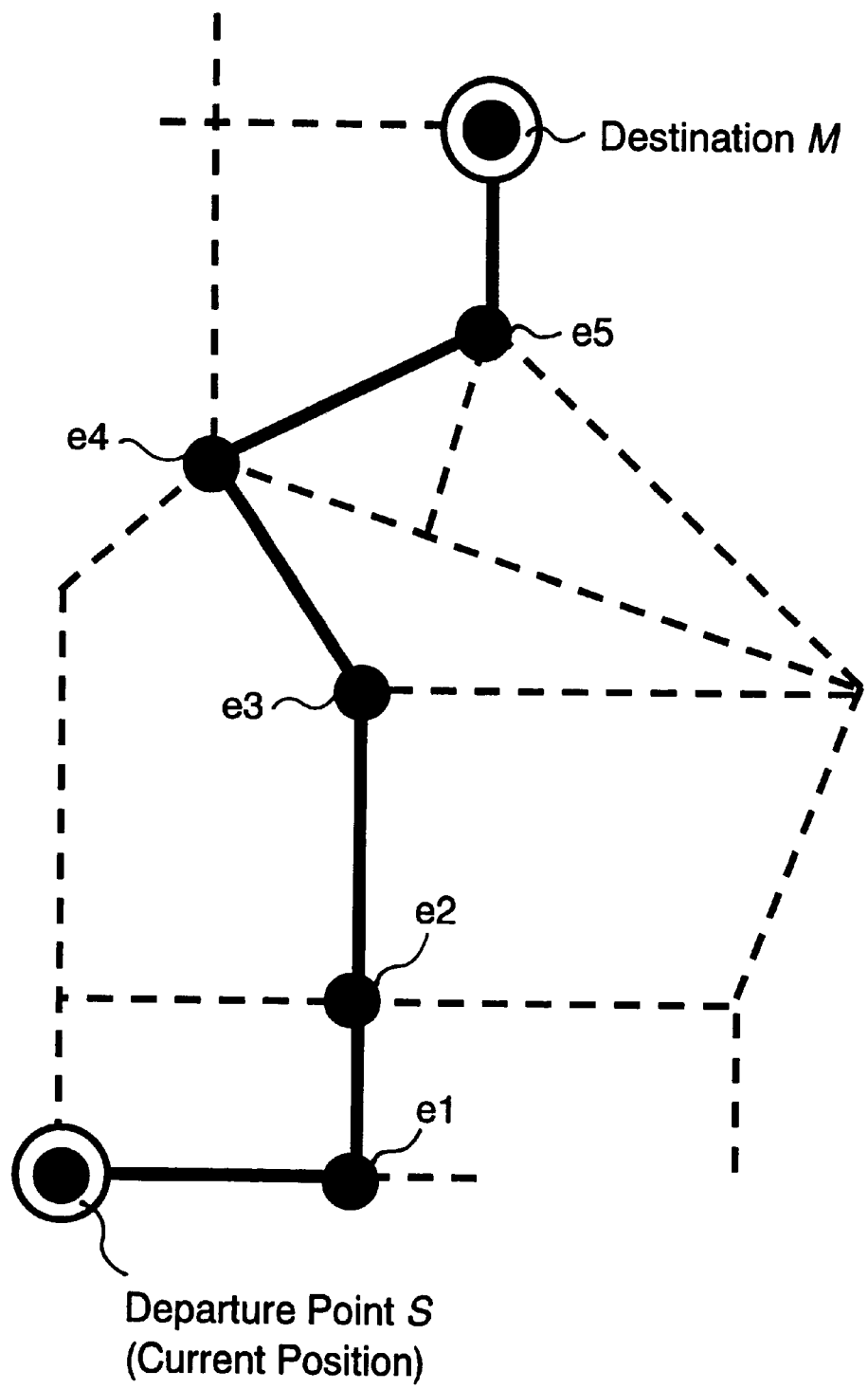
FIG. 10 is an illustration which schematically shows the recommended route and traveling intersections located on the determined recommended route.

FIGS. 9 and 10 schematically illustrate the operations carried out in the navigation center 150.

As shown in FIG. 9, after receiving departure point data for the departure point S and destination data for the destination M from the navigation apparatus 100, the navigation center 150 determines the recommended route (shown by the solid line) based on the intersection data and the road data stored in the map information storing section 1531. Examples of the road data is indicated by the dotted lines in this drawings.

Next, as shown in FIG. 10, the traveling intersections e1, e2, e3, e4 and e5 on the determined recommended route are specified, and then a string of coordinate data of each of the traveling intersections e1, e2, e3, e4 and e5 (i.e., intersection specifying data) is transmitted from the navigation center 150 to the navigation apparatus 100.

Figure 11:
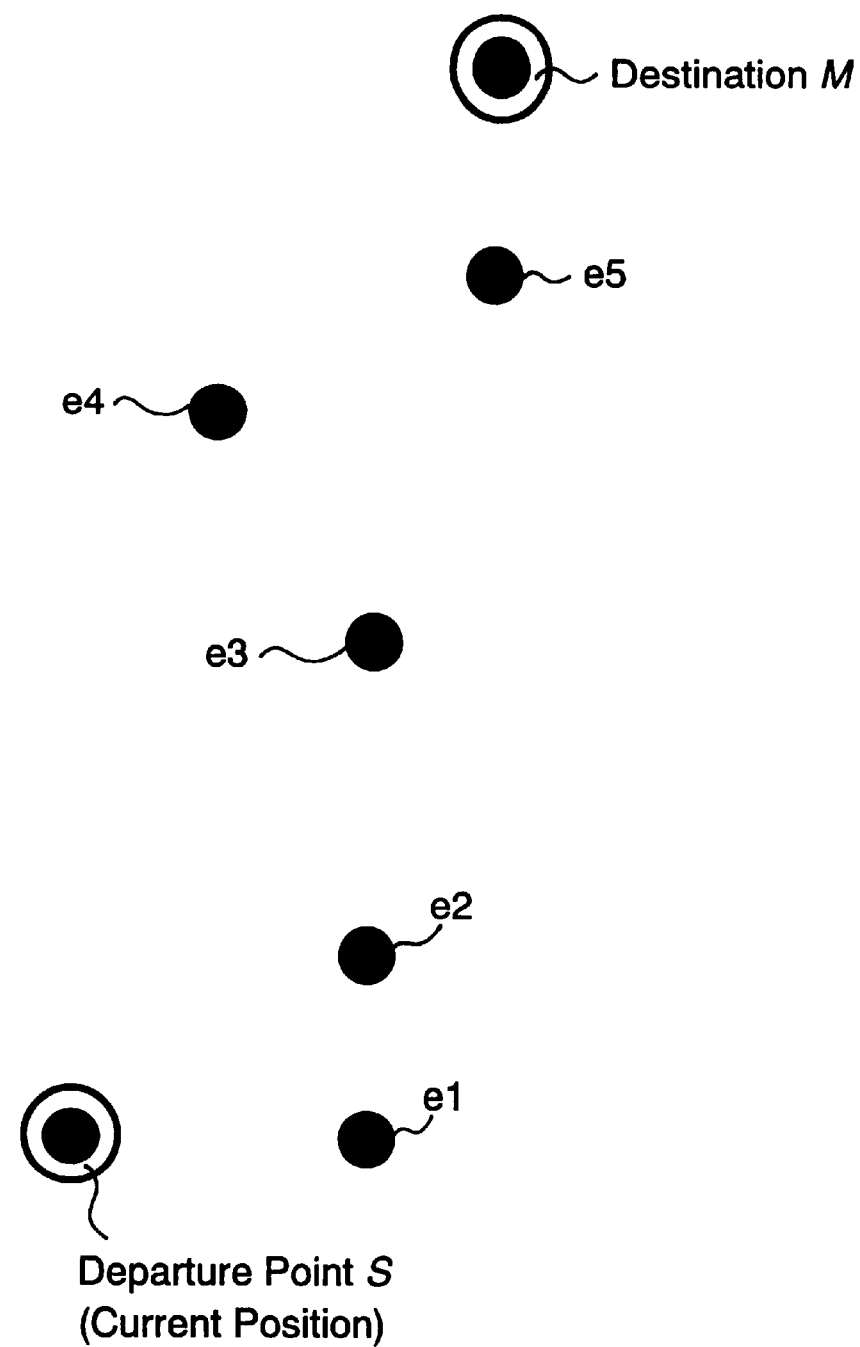
FIG. 11 is an illustration which schematically shows a state in which a departure point, a destination, traveling intersections are arranged at points determined by their coordinates.
Figure 12:
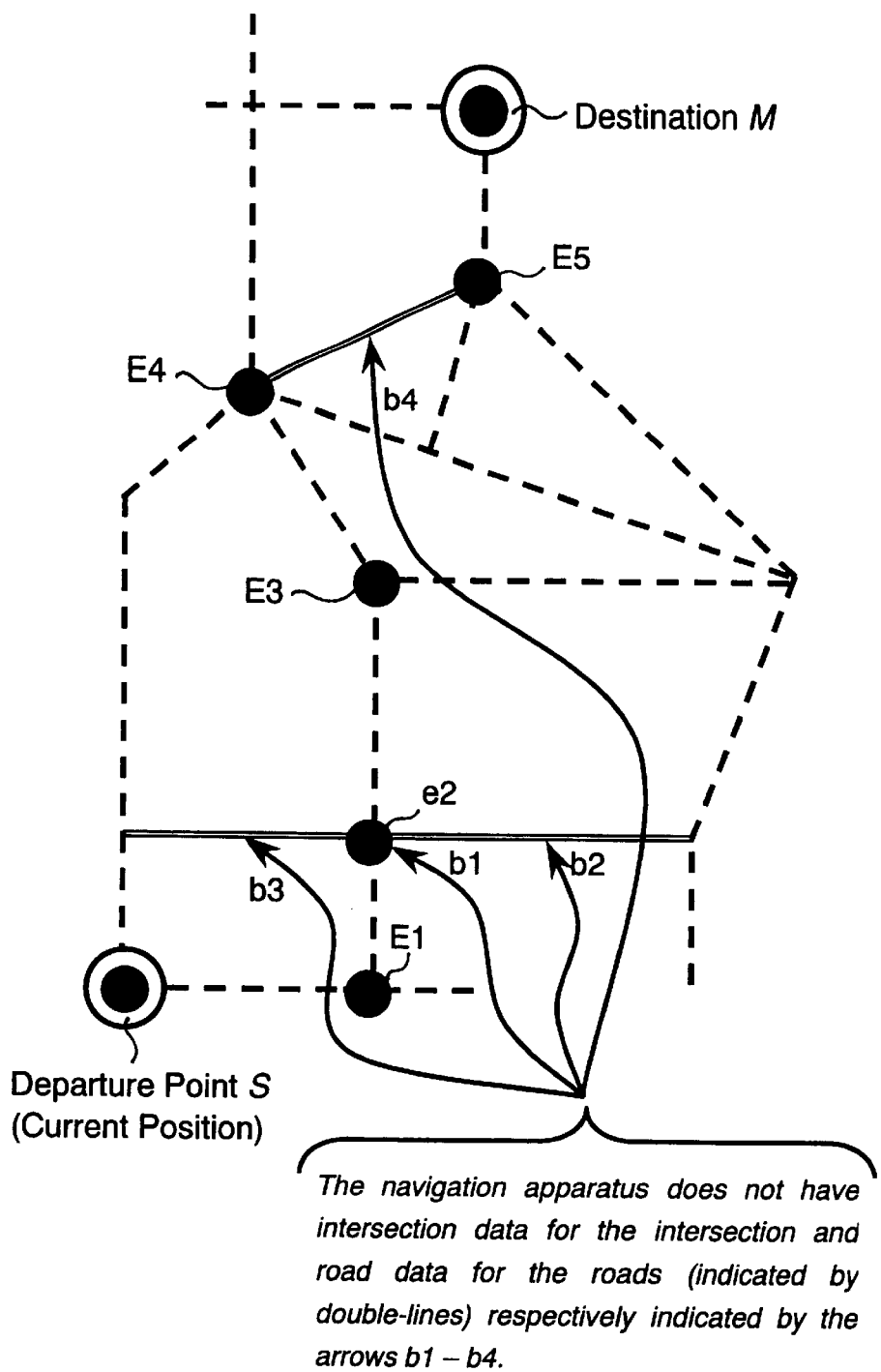
FIG. 12 is an illustration which schematically shows differences between data stored in the navigation apparatus and data stored in the navigation center.
Figure 13:
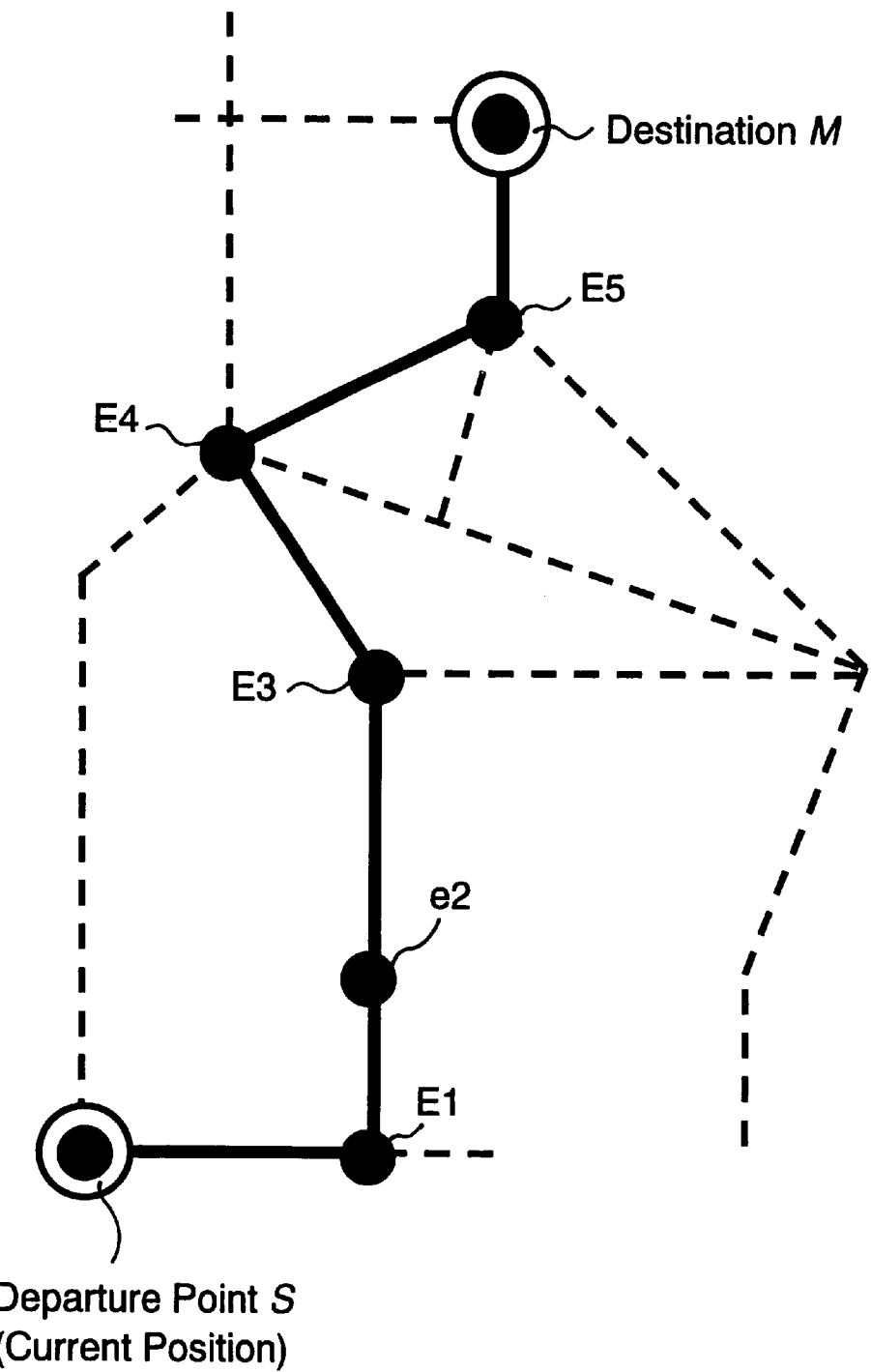
FIG. 13 is an illustration which schematically shows a recommended route recognized in the navigation apparatus.

FIGS. 11–13 schematically illustrate the operations carried out in the navigation apparatus 100.

First, when the intersection data (for intersections E1, E3–E5) and road data (indicated by the dotted lines) in the navigation apparatus 100 shown in FIG. 12 are compared with the intersection data and road data of the navigation center 150 shown in FIGS. 9 and 10, it is seen that there are differences between the data in the navigation apparatus 100 and the data in the navigation center 150. Namely, the navigation center 150 has intersection data for the traveling intersection e2 (which is shown by the arrow b1 in FIG. 12) and road data for the roads (which are indicated by the arrows b2, b3 and b4 and represented with the double-lines in FIG. 12), while the navigation apparatus 100 does not have them. Further, with regard to the road between the intersection E1 and the intersection E3, the navigation apparatus 100 only has road data for the road directly connecting the intersections E1 and E3, while the navigation center 150 has road data for the road between the intersections e1 and e2 and road data for the road between the intersections e2 and e3, separately.

Accordingly, when the navigation apparatus 100 receives a string of coordinate data of each of the traveling intersections e1, e2, e3, e4 and e5 from the navigation center 150, such coordinate data is stored in the RAM together with the transmitted data concerning the departure point S and destination M. In this connection, FIG. 11 shows the state in which the departure point S, the traveling intersections e1–e5 and the destination M are arranged at points determined by their coordinates.

Then, in the navigation apparatus 100, the coordinates of the traveling intersections are sequentially read out to carry out a matching process. The matching process is carried out using the coordinate data contained in the intersection specifying data and the data stored in the map information storing section 1031. In this matching process, the processor 101 of the navigation apparatus 100 judges whether or not intersection data for each of the traveling intersections specified by the received intersection specifying data is contained or is considered to be contained in the data in the map information storing section 1031 of the navigation apparatus 100. This judgement is carried out for each of the traveling intersections specified by the intersection specifying data. In the embodiment shown in FIG. 12, the processor 101 of the navigation apparatus 100 judges that intersection data for the traveling intersection e2 is not contained nor considered to be contained in the data in the map information storing section 1031. (This case corresponds to the case where the matching process for the traveling intersection e2 has not been performed successfully.) Further, the processor 101 judges that intersection data for the traveling intersections E1 and E3–E5 is contained or is considered to be contained in the data in the map information storing section 1031. (This case corresponds to the case where the matching process for each of the traveling intersections E1 and E3–E5 has been performed successfully.) Then, with regard to the intersection data for the intersection e2, the processor 101 produces route guidance data (which is used for performing route guidance for the recommended route from the departure point S to the destination M) using the intersection specifying data as it is as described hereinbelow. Further, with regard to the intersections E1 and E3–E5, the processor 101 produces the route guidance data using the intersection data for these intersections contained in the map information storing section 1031.

In addition to the matching process, a road identifying process for identifying roads between the traveling intersections is also carried out. In this way, as shown in FIG. 13, the roads between the traveling intersections indicated by solid lines are determined.

In this road identifying process, with regard to the road between the departure point S and the intersection E1, the road between the intersection E3 and the intersection E4, and the road between the intersection E5 and the destination M, road data stored in the road data file of the map information storing section 1031 are used as they are.

With regard to the road between the intersections E4 and E5, since the navigation apparatus 100 does not have road data for a road directly connecting the intersections E4 and E5, the road is judged to be a newly-built road. In this case, the navigation apparatus 100 establishes this newly-built road by interpolating the intersections E4 and E5, that is, by linking the intersections E4 and E5 with the straight line, as shown in this drawing.

Further, because the traveling intersection e2 determined as a newly-built intersection lies on the road connecting intersection E1 and intersection E3, the road between the intersections E1 and E3 is divided into two roads at the location of the intersection e2, and these two roads are respectively identified as the road between the intersections E1 and e2 and the road between the intersections e2 and E3.

In this connection, in the case where the traveling intersection e2 does not lie on the road connecting the intersection E1 and the intersection E3, the road between the intersections E1 and e2 and the road between the intersections e2 and E3 are identified as newly-built roads. In such a case, the newly-built roads are respectively established by linking the intersections E1 and e2 with straight line and by linking the intersections e2 and E3 with straight line.

In this way, as shown in FIG. 13, the traveling route (determined recommended route) is identified by the intersections E1, e2, E3, E4, E5 and the roads shown by the solid lines between these intersections, and data for such a traveling route is stored in the route guidance data storing section 1032 of the navigation apparatus 100.

Next, a detailed description will be given for the operations carried out in the navigation apparatus 100 with reference to FIGS. 14–17.

Figure 14:
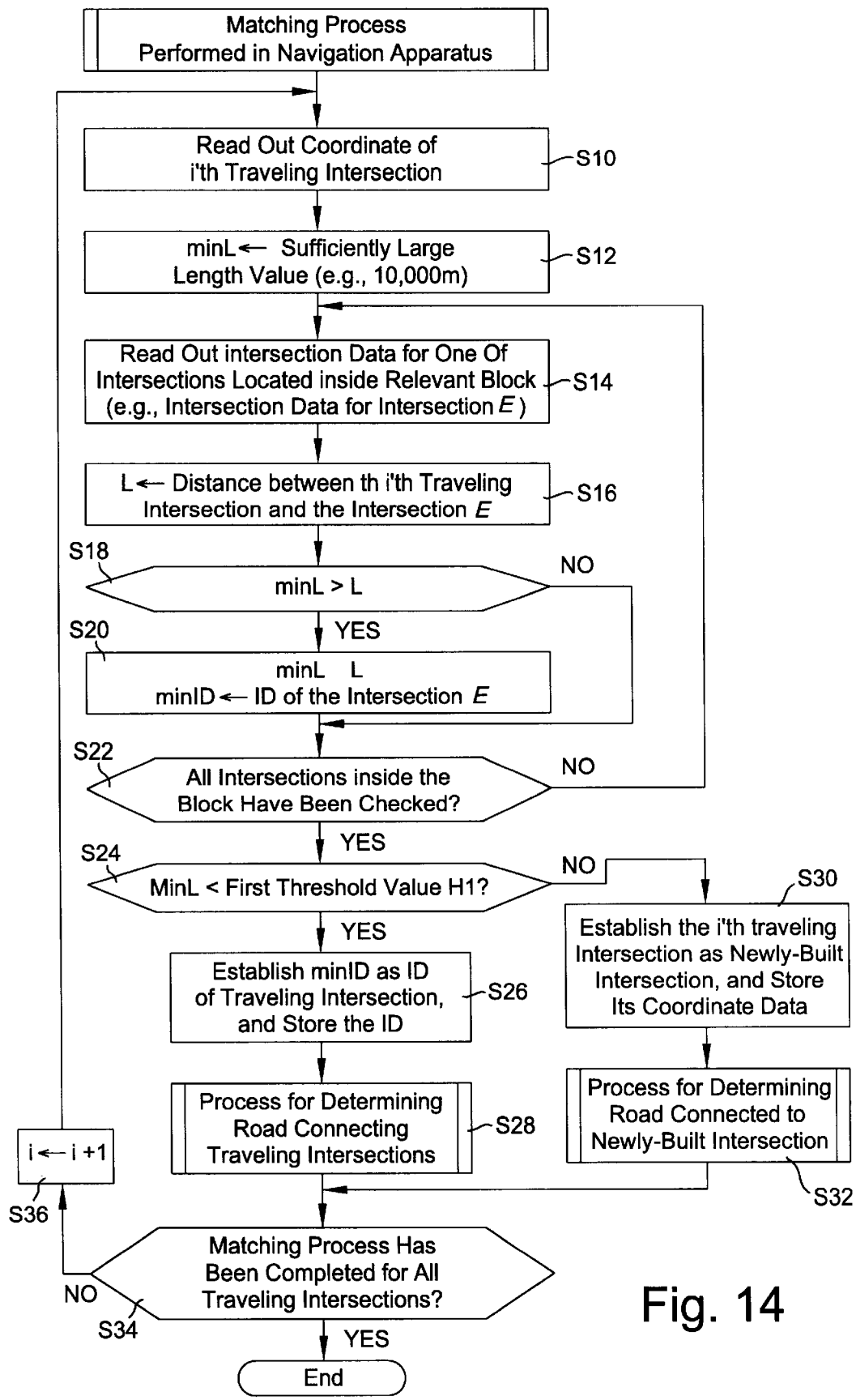
FIG. 14 is a flowchart which shows a matching process performed in the navigation apparatus.

FIG. 14 is a flowchart which shows a main routine of matching process performed in the navigation apparatus 100.

First, the processor 101 of the navigation apparatus 100 reads out coordinate data of the i'th traveling intersection from the string of coordinate data of the traveling intersections stored in the RAM (Step S10). Then, the processor 101 establishes a sufficiently large length value (e.g., 10,000 m) as minL (Step S12) (See "minL" in FIGS. 19 and 20).

Next, the processor 101 searches for an intersection closest to the coordinates of the i'th traveling intersection which has been read out at Step S10. Namely, referring to an intersection data file as shown in FIG. 3, the processor 101 reads out intersection data for one of intersections located inside a relevant block to which the i'th traveling intersection belongs (Step S14). (In this embodiment, for the sake of clarity, the following description is given on the assumption that at Step S14 the processor reads out intersection data for an intersection "E".) Then, the processor 101 measures the distance from the i'th traveling intersection to the intersection E (i.e., the distance between the point at the coordinates of the i'th traveling intersection and the point at the coordinates of the intersection E). Then, the processor 101 establishes the measured distance as L (Step S16).

Next, at Step S18, the processor 101 compares the value L established at Step S16 with the value minL established at Step S12. In the case where the value L is smaller than the value minL (i.e., a YES judgement at Step S18), the processor 101 considers that at this stage the intersection E is the closest intersection to the i'th traveling intersection, and sets the value of minL to L (Step S20). per, at Step S20, the processor 101 establishes the intersection ID (e.g., intersection number) of the intersection E as a minID.

On the other hand, in the case where the value L is greater than the value minL (i.e., a NO judgment at Step S18), the processor 101 considers that the intersection E is not the closest intersection to the i'th traveling intersection. In such a case, the program proceeds to Step S22.

Then, the processor 101 judges at Step S22 whether or not all the intersections inside the block have been checked. In the case where there are still unchecked intersections inside the block (i.e., a NO judgement at Step S22), the program returns to Step S14, and the processor 101 continues to check the unchecked traveling intersections (Step S14–Step S20).

On the other hand, in the case where checks of all the intersections in the block have been completed (i.e., a YES judgement at Step S22), the processor 101 judges at Step S24 whether or not the value minL is less than a first threshold value H1, namely, whether or not the intersection E considered to be closest to the i'th traveling intersection lies with a predetermined distance H1 (first threshold value H1) from the point represented by the coordinates of the i'th traveling intersection. In this connection, it is to be noted that in this invention the first threshold value H1 has to be set within an extent in which the differences between the coordinates of the intersection E and the coordinates of the i'th traveling intersection can be considered to be allowable error. With regard to this first threshold value H1, a detail description will be made later with reference to the circles H1 (i.e., circles whose radius is the distance H1) shown in FIGS. 18–23.

In the case where the value minL is less than the first threshold value H1 (i.e., a YES judgement at Step S24), the processor 101 considers that the intersection E lies within the range which can be considered to be allowable error (i.e., within the predetermined distance H1 from the point represented by the coordinates of the i'th traveling intersection). In such a case, the processor 101 establishes the minID (which has been established at Step S20) as an intersection ID of the traveling intersection, and then stores this intersection ID (=minID) in the route guidance data storing section 1032 (Step S26). Then, the processor 101 carries out a subroutine (that is, a process for determining a road connecting traveling intersections) shown in FIG. 15 described below (Step S28).

On the other hand, in the case where the value minL is greater than the first threshold value H1 (i.e., a NO judgement at Step S24), the processor 101 considers that the i'th traveling intersection is a newly-built intersection on the recommended route, and establishes the i'th traveling intersection as a newly-built intersection (Step S30). Further, at Step S30, the processor stores the coordinate data of the i'th traveling intersection in the route guidance data storing section 1032. Then, at Step S32, the processor 101 carries out the subroutine (that is, a process for determining a road connected to a newly-built intersection) shown in FIGS. 16A and 16B described below.

After carrying out the road determining process at Step S28 or Step S32, the processor 101 judges whether or not the matching process has been completed for all the traveling intersections (Step S34). In this regard, it is to be noted that in the case where the traveling intersections are identified from the side of the departure point S, the matching process is also performed for the destination M in addition to the traveling intersections. Further, in the case where the traveling intersections are identified from the side of the destination M, the matching process is also performed for the departure point S in addition to the traveling intersections.

In the case where the matching process has not been completed for all the traveling intersections (i.e., a NO judgement at Step S34), the processor 101 adds the integer 1 to the value of i (Step S36), and then the processor 101 performs the matching process for the next traveling intersection (i e. i+1'th traveling intersection).

Figure 15:
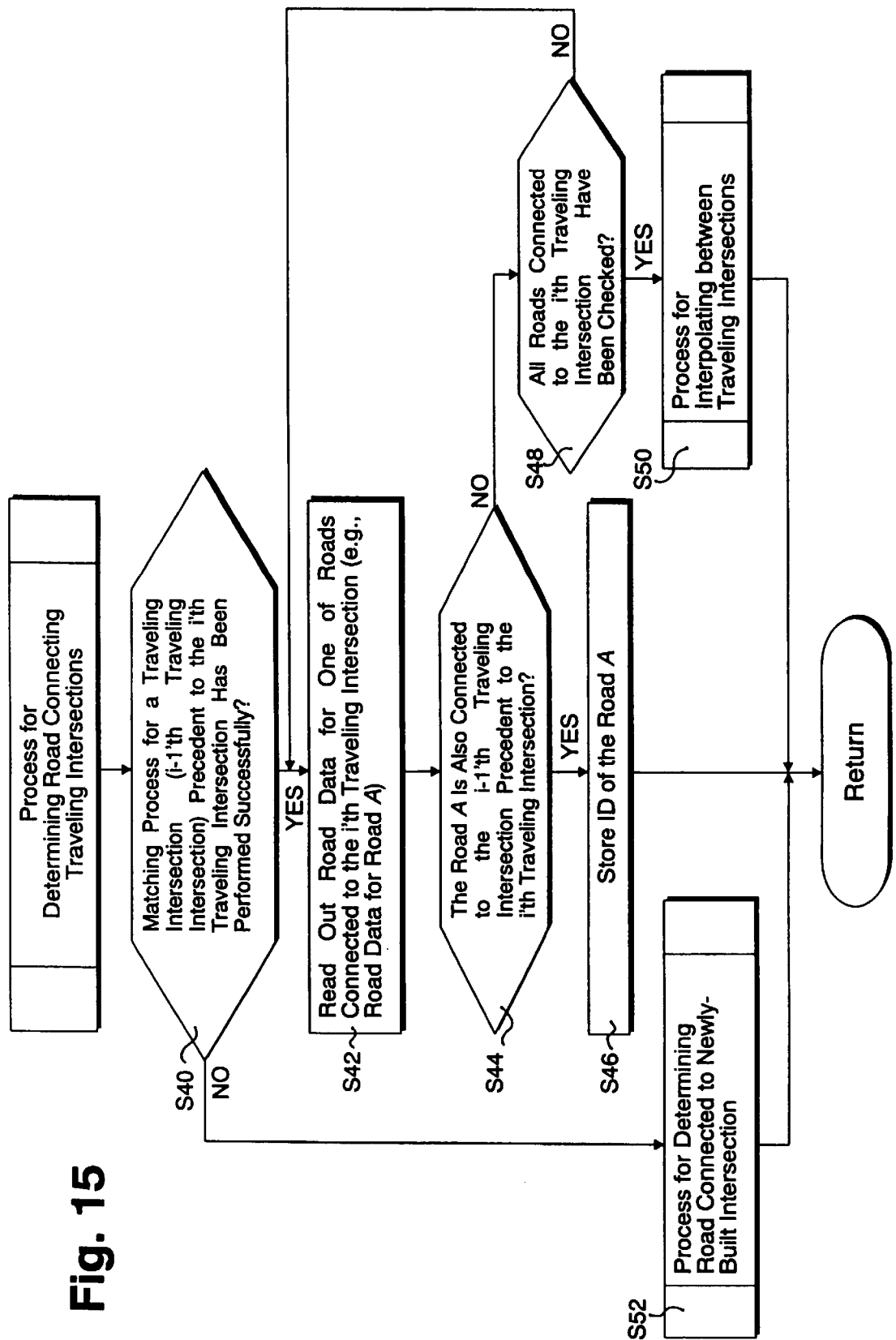
FIG. 15 is a flowchart which shows a process for determining a road connecting traveling intersections performed in the navigation apparatus.

FIG. 15 is a flowchart which shows a process for determining a road connecting traveling intersections, which is carried out in the navigation apparatus 100. In this connection, it is to be noted that the process shown in FIG. 15 is executed to determine (set) a road connecting traveling intersections in the case where the catching process has been successfully carried out for the i'th traveling intersection. Further, it is also to be noted that this process is based on the assumption that adjacent two traveling intersections are directly connected with a single road.

First, the processor 101 of the navigation apparatus 100 judges whether or not the matching process for an i–1'th traveling intersection precedent to the i'th traveling intersection has been performed successfully (Step S40). In other words, at this step, the processor 101 judges whether or not intersection data for the i–1'th traveling intersection specified by the intersection specifying data (that is, intersection data for the i–1'th traveling intersection located at the coordinates specified by the intersection specifying data) is contained or is considered to be contained in the data in the map information storing section 1031 of the navigation apparatus 100.

In the case where the matching process for the i–1'th traveling intersection has been performed successfully (i.e., a YES judgement at Step S40), the processor 101 reads out road data for one of roads connected to the i'th traveling intersection (Step S42). In other word, from the road data file as shown in FIG. 4, the processor 101 reads out road data for one of roads whose ending point is the i'th traveling intersection. (For the sake of clarity, hereinafter the description will be given on the assumption that at Step S42 the processor 101 reads out road data for Road A.)

Then, the processor 101 judges whether or not Road A whose road data has been read out at Step S42 is also connected to the i–1'th traveling intersection precedent to the i'th traveling intersection (Step S44).

In the case where Road A is judged to be connected to the i–1'th traveling intersection (i.e., a YES judgement at Step S44), the processor 101 identifies Road A as a road directly connecting the i'th and i–1'th traveling intersections. Then, at Step S46, the processor 101 stores the road ID (e.g., road number) of Road A in the route guidance data storing section 1032 (Step S46). After this step, the program returns to the main routine shown in FIG. 14. In this regard, route guidance data produced through the processes at the above-mentioned Steps S26 and S46 will be described later with reference to the example shown in FIG. 18.

On the other hand, in the case where Road A is connected to the i'th traveling intersection but not connected to the i–1'th traveling intersection (i.e., a NO judgement at Step S44), the processor 101 judges at Step S48 whether or not a check of all the roads connected to the i'th traveling intersection has been completed.

In the case where a check of all the roads has not been completed (i.e., a NO judgement at Step S48), the program returns to Step S42, and then the processor 101 continues to check the unchecked roads.

On the other hand, in the case where a check of all the roads has been completed (i.e., a YES judgement at Step S48), the processor 101 considers that road data for a road directly connecting the i'th and i−1'th traveling intersections (that is, road data for a road whose starting point is the i−1'th traveling intersection and whose ending point is the i'th traveling intersection) is not contained in the data in the map information storing section 1031 of the navigation apparatus 100. In such a case, the processor 101 judges that a road directly connecting the i'th and i−1'th traveling intersections is a newly-built road, and then at Step S50 the processor 101 executes the subroutine shown in FIG. 17 (that is, a process for interpolating between traveling intersections). In this regard, route guidance data produced through the processes at the above-mentioned Steps S28, S44 (NO judgement), S48 (YES judgement) and S50 will be described later with reference to the example shown in FIG. 22.

Now, in the case where the processor 101 judges at Step S40 that the matching process for the i-i'th traveling intersection has not been performed successfully (i.e., a NO judgement at Step S40). at Step S52 the processor 101 executes the subroutine shown in FIGS. 16A and 16B (that is, a process for determining a road connected to a newly-built intersection), which will be described below. After the completion of this subroutine, the program returns to the main routine shown in FIG. 14.

Figure 16A:
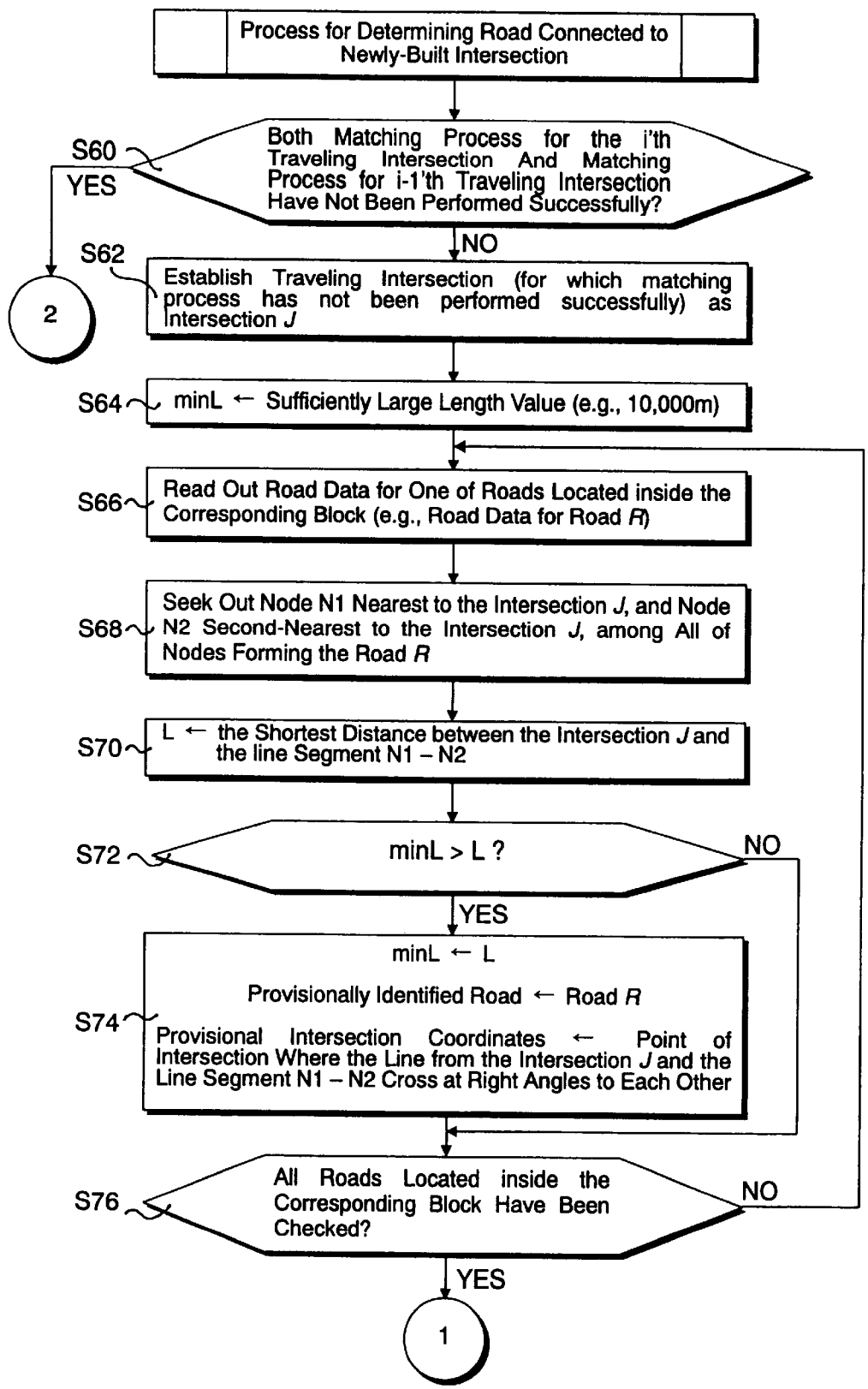
FIGS. 16A and 16B is a flowchart which shows a process for determining a road connected to a newly-built intersection performed in the navigation apparatus.
Figure 16B:
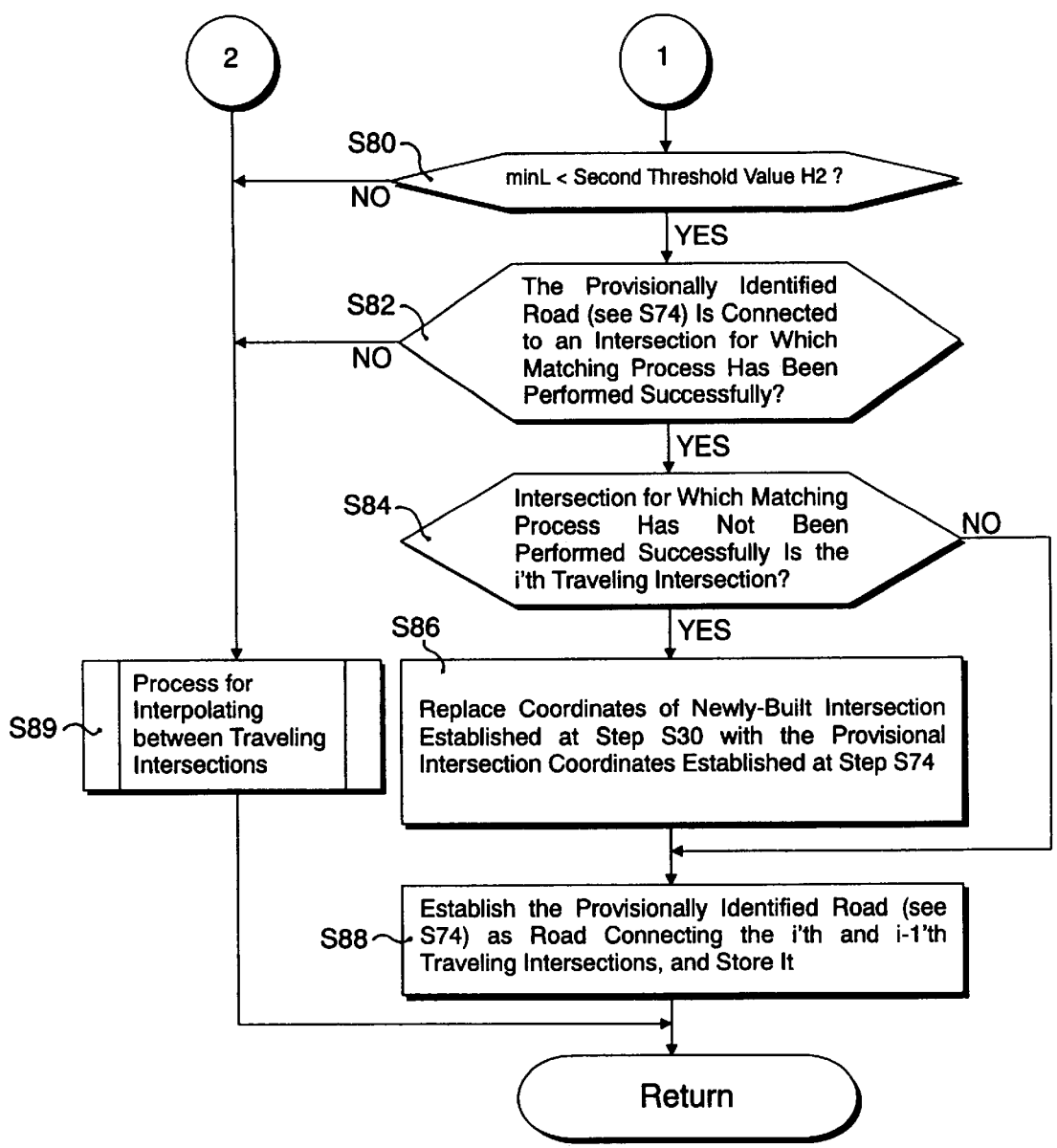

FIGS. 16A and 16B is a flowchart which shows a process for determining a road connected to a newly-built intersection. This process is executed in the case where one of traveling intersections is considered to be a newly-built intersection.

Figure 19:
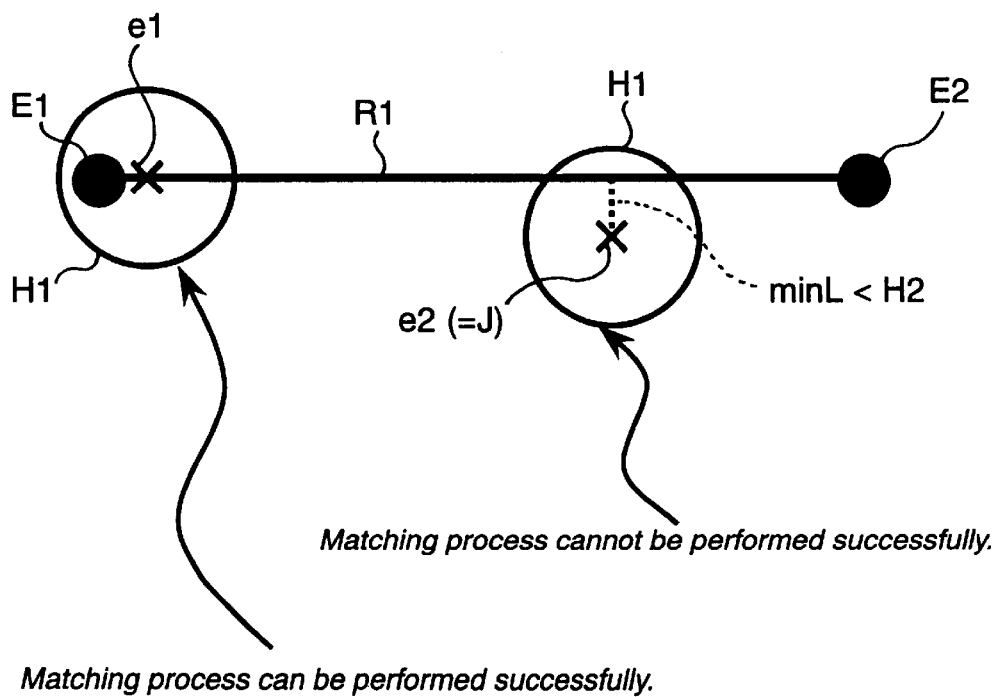
FIG. 19 is an illustration which shows an example where a matching process for one of adjacent two traveling intersections cannot be performed successfully, and the navigation apparatus has road data for a road connecting these traveling intersections.
Figure 20:
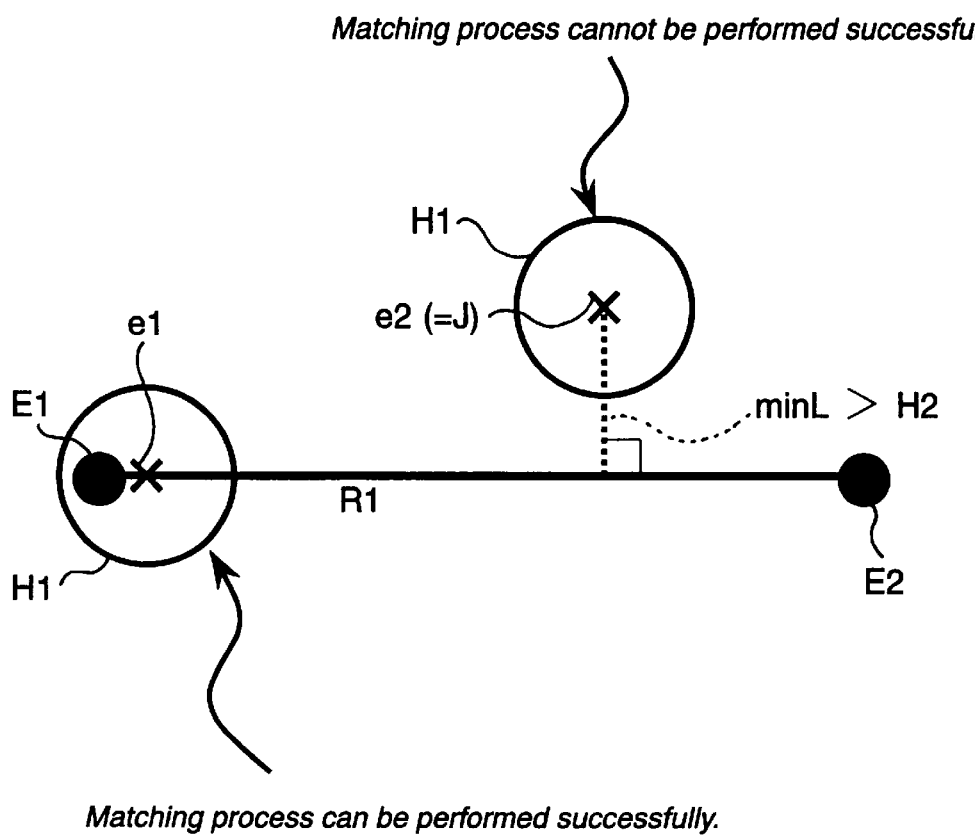
FIG. 20 is an illustration which shows an example where a matching process for one of adjacent two traveling intersections cannot be performed successfully, and the navigation apparatus does not have road data for a road connecting these traveling intersections.

First, the processor 101 judges at Step S60 whether or not both the matching process for the i−1'th traveling intersection and the matching process for the i'th traveling intersection have been performed successfully. In other words. at this step, based on judgement results in the main routine shown in FIG. 14, the processor 101 judges whether or not both the i'th and i−1'th traveling intersections have been considered to be newly-built intersections in the case where the processor 101 judges at Step S60 that the matching process for only one of the adjacent two traveling intersections has not been performed successfully (i.e., a NO judgement at Step S60), the processor 101 establishes the one traveling intersection, for which the matching process has not been performed successfully, as a traveling intersection "J" (Step S62). Such a situation is schematically illustrated in FIGS. 19 and 20. (For easier understanding, hereinafter, a traveling intersection, for which the matching process has been performed successfully, is referred to as a "matched traveling intersection." Further, a traveling intersection, for which the matching process has not been performed successfully, is referred to as an "unmatched traveling intersection.")

In this connection, it should be noted that a No judgement at Step S60 is made in each of the following two cases. Case 1: The i−1'th traveling intersection is a matched traveling intersection, and the i'th traveling intersection is an unmatched traveling intersection. Case 2: The i'th traveling intersection is a matched traveling intersection, and the i−1'th traveling intersection is an unmatched traveling intersection.

Namely, in Case 1, the i'th traveling intersection is established as the traveling intersection J. Further, in Case 2, the i−1'th traveling intersection is established as the traveling intersection J.

Then, the processor 101 establishes a sufficiently large length value (e.g., 10,000 m) as a value minL (Step S64).

Next, the processor 101 executes processes described below (Steps S66–S74) in order to make a judgement as to whether or not the traveling intersection J established at Step S62 is considered to be a newly-built intersection on a road whose road data is stored in the map information storing section 1031 of the navigation apparatus 100. In other words, through executing processes described below, the processor 101 judges whether or not road data for a road that directly connects a matched traveling intersection and an unmatched traveling intersection (traveling intersection J) adjacent thereto is contained or is considered to be contained in the data in the map information storing section 1031.

First, in order to find a road that runs closest to the traveling intersection J (which is an unmatched traveling intersection), the processor 101 reads out road data for one of roads located inside the block. (For the sake of clarity, the following description is given on the assumption that at Step S66 road data for Road "R" is read out.)

Next, based on the node data file as shown in FIG. 5, the processor 101 seeks out Node N1 nearest to the traveling intersection J and Node N2 second-nearest to the traveling intersection J, among all of nodes which form Road R read out at Step S66 (Step S68). After reading out node data of Nodes N1 and N2, the processor 101 computes the shortest distance from the traveling intersection J to the line segment N1-N2 (i.e., the distance from the traveling intersection J to the line segment N1-N2 along a perpendicular line drawn from the traveling intersection J to the line segment N1-N2), and then the processor 101 establishes the computed distance as L (Step S70).

Next, the processor 101 compares the value minL established at Step S64 with the value L established at Step S70 (Step S72). In the case where the value L is smaller than the value minL (i.e., a YES judgement at Step S72), the processor 101 considers that at this stage Road R is a road that runs closest to the traveling intersection J. In such a case, the processor 101 sets the value minL to the value of L, and establishes Road R as a provisionally identified road (Step S74). Further, in this step, the processor 101 establishes provisional intersection coordinates using the coordinates of the intersection point of the line segment N1-N2 and the perpendicular line from the traveling intersection J.

On the other hand, in the case where the value L is greater than the value minL (i.e., a NO judgement at Step S72), the processor 101 considers that Road R is not a road that runs closest to the traveling intersection J. In such a case, the program proceeds to Step S76.

Next, the processor 101 judges whether or not all the roads inside the block have been checked. In the case where there are still unchecked roads inside the block (i.e., a NO judgement at Step S76), the program returns to Step S66, and then the processor 101 continues to check the unchecked roads in the same manner (Step S66–Step S76).

On the other hand, in the case where a check of all the roads has been completed (i.e., a YES judgement at Step S76), the processor 101 judges at Step S80 whether or not the value minL is less than a second threshold value H2. In other words, at this step, the processor 101 judges whether or not the traveling intersection J lies within a predetermined distance H2 (a second threshold value H2) from the intersection point of the line segment N1-N2 and the perpendicular line from the traveling intersection J. In this connection, it is to be noted that in this invention the second threshold value H2 has to be determined within an extent in which the difference between the coordinates of the traveling intersection J and the coordinates of the intersection point of the line segment N1-N2 and the perpendicular line from the traveling intersection J can be considered to be allowable error. With regard to this second threshold value H2, a detail description will be made later with reference to the distance H2 (which is indicated by the dotted line) shown in FIGS. 19 and 20.

In the case where the value minL is less than the second threshold value H2 (i.e., a YES judgement at Step S80), the processor 101 judges at Step S82 whether or not the provisionally identified Road R established at Step S74 is connected to the matched traveling intersection. For example, in Case 1 described above, since the i'th traveling intersection corresponds to a traveling intersection J which is an unmatched intersection, the processor 101 judges at Step S82 whether or not the starting point of the provisionally identified Road is the i−1'th traveling intersection which is a matched traveling intersection. Further, in Case 2, since the i−1'th traveling intersection corresponds to a traveling intersection J which is an unmatched intersection, the processor 101 judges at Step S82 whether or not the ending point of the provisionally identified Road is the i'th traveling intersection which is a matched traveling intersection.

Next, in the case where the provisionally identified Road R is connected to the matched traveling intersection (i.e., a YES judgement at Step S82), the processor 101 judges at Step S84 whether or not the unmatched intersection is the i'th traveling intersection.

In the case where the unmatched traveling intersection is the i'th traveling intersection (i.e., a YES judgement at Step S84), at Step S86 the processor 101 replaces the coordinates of the i'th traveling intersection (which has been established as a newly-built intersection at Step S30 in FIG. 14) with the provisional intersection coordinates established at Step S74. In other words, at this step, the processor 101 replaces the coordinates of the i'th traveling intersection with the coordinates of the intersection point of the provisionally identified Road R and the perpendicular line from the traveling intersection J.

On the other hand, in the case where the unmatched traveling intersection is the i−1'th traveling intersection (i.e., a NO judgement at Step S84), the processor 101 considers that the process at Step S86 has already been carried out for the i−1'th traveling intersection in the preceding routine. In such a case, the process at Step S86 is skipped, and the program proceeds to Step S88.

Then, at Step S88, the processor 101 considers that the traveling intersection J which is an unmatched traveling intersection lies on the provisionally identified Road R (that is, considers that the traveling intersection J is located between the starting point and the ending point of the provisionally identified Road R), and then the processor 101 establishes the provisionally identified road R as a road directly connecting i'th and i−1'th traveling intersections. Further, at this step, road data for this established road (i.e., road data for Road R) is stored as a piece of route guidance data in the route guidance data storing section 1032. After the completion of the process at Step S88, the program returns to the main routine shown in FIG. 14. In this regard, route guidance data produced through the processes at the above-mentioned Steps S32, S86 and S88 will be described later with reference to the example shown in FIG. 19.

Now, in any one of the following cases (i)–(iii), the subroutine at Step S89 (i.e., a process for interpolating between traveling intersections) is executed in the process shown in FIGS. 16A and 16B. Case (i): Both the matching process for the i−1'th traveling intersection and the matching process for the i'th traveling intersection have not been performed successfully (i.e., a YES judgement at Step S60). Case (ii): The value minL is greater than the second threshold value H2 (i.e., a NO judgement at Step S80), Case (iii): The provisionally identified Road R established at Step S74 is not connected to the matched traveling intersection (i.e., a NO judgement at Step S82).

In this regard, route guidance data produced through the processes at the above-mentioned Steps S30, S32, S60 (YES judgement) and S89 will be described later with reference to the example shown in FIG. 23. Further, route guidance data produced through the processes at the above-mentioned Steps S32, S80 (NO judgement) and S89 will be described later with reference to the example shown in FIG. 20. Furthermore, route guidance data produced through the processes at the above-mentioned Steps S32, S82 (NO judgement) and S89 will be described later with reference to the example shown in FIG. 21.

Figure 17:
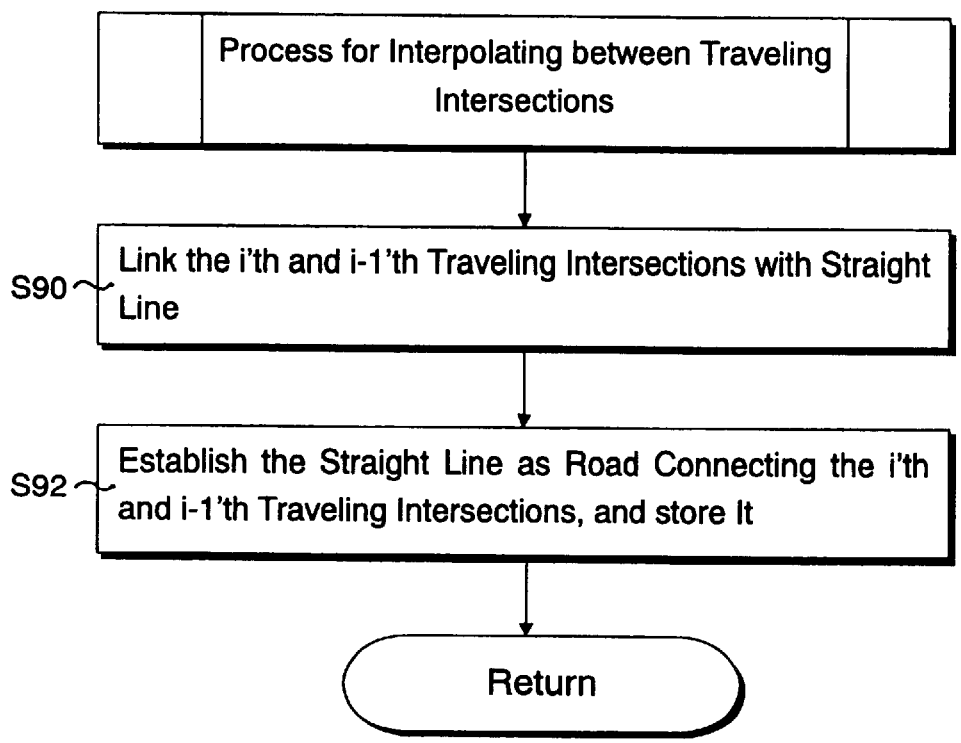
FIG. 17 is a flowchart which shows a process for interpolating between traveling intersections performed in the navigation apparatus.

FIG. 17 is a flowchart which shows a process for interpolating between traveling intersections performed in the navigation apparatus 100. This process is carried out in the case where road data for a road that directly connects adjacent two traveling intersections is not contained nor considered to be contained in the data in the map information storing section 1031 of the navigation apparatus 100.

First, the processor 101 interpolates between the i'th traveling intersection and the i−1'th traveling intersection precedent thereto by linking these traveling intersections with a straight line (Step S90). Then, the processor 101 produces road data for a road lying between the i'th and i−1'th traveling intersections using this straight line, and then stores the produced route data in the route guidance data storing section 1032 (Step S92). After the completion of the process at Step S92, the program returns to the main routine shown in FIG. 14.

Next, FIGS. 18–23 show examples in which intersections and roads are established in accordance with the processes of FIGS. 14–17 described above.

In FIGS. 18–23, the traveling intersections e1 and e2 are shown by the symbol "X", wherein e1 represents the i−1'th traveling intersection, and e2 represents the i'th traveling intersection.

The intersections E1, E2, . . . shown by the symbol "●" represent intersections whose intersection data is stored in the intersection data file (as shown in FIG. 3) in the map information storing section 1031 of the navigation apparatus 100. (For easier understanding, hereinafter, an intersection whose intersection data is stored in the navigation apparatus 100 is simply referred to as a "vehicle-held intersection").

The solid lines R1, R2, . . . drawn between the vehicle-held intersections E1, E2, . . . represent roads whose road data is stored in the intersection data file (as shown in FIG. 4) in the map information storing section 1031 of the navigation apparatus 100. Hereinafter, a road whose road data is stored in the navigation apparatus 100 is simply referred to as a "vehicle-held road").

In these figures, each circle H1 has a radius equal to the first threshold value H1 and is centered at the traveling intersections e1 (e2). In this connection, in the case where a vehicle-held intersection lies inside the circle H1, a matching process for a traveling intersection is considered to be performed successfully. In such a case, the vehicle-held intersection is identified as a traveling intersection whose intersection data is stored in the navigation apparatus, and then the intersection data for the vehicle-held intersection is stored in the route guidance data storing section 1032.

Figure 18:
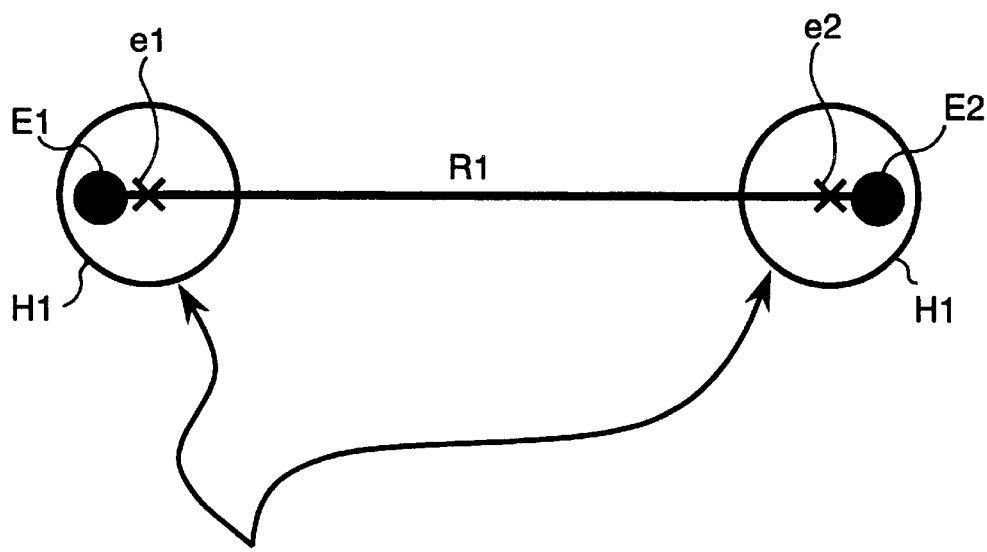
FIG. 18 is an illustration which shows an example where matching processes for adjacent two traveling intersections can be performed successfully.

FIG. 18 is an illustration which shows an example where matching processes for adjacent two traveling intersections e1 and e2 can be performed successfully.

In the example shown in FIG. 18, the vehicle-held intersection E1 lies within the circle H1 which has a radius equal to the first threshold value H1 and which is centered at the traveling intersection e1. In this situation, the matching process for the traveling intersection e1 can be performed successfully, since intersection data for the traveling intersection e1 is considered to be contained in the data stored in the map information storing section 1031 of the navigation apparatus 100. Similarly, the matching process for the traveling intersection e2 can also be performed successfully.

In the case described above, the navigation apparatus 100 stores the intersection ID of each of the vehicle-held intersections E1 and E2 in the route guidance data storing section 1032, which corresponds to the process at Step S26 shown in FIG. 14. Further, the navigation apparatus 100 stores the road ID of the vehicle-held road R1 in the route guidance data storing section 1032, which corresponds to the process at Step S46 shown in FIG. 15.

FIG. 19 is an illustration which shows an example where a matching process for one of adjacent two traveling intersections cannot be performed successfully, and the navigation apparatus 100 has road data for a road that directly connects these traveling intersections. The situation in this figure schematically shows the processes carried out through Steps S32, S86 and S88 in FIGS. 14, 16A and 16B.

In this example, the matching process for the traveling intersection e1 specified by the intersection specifying data received from the navigation center 150 can be performed successfully. Further, the matching process for the traveling intersection e2 can not be performed successfully, because there is no vehicle-held intersection lying within the circle H1 centered at the traveling intersection e2 (that is, within the circle H1 defined with respect to the traveling intersection e2).

In the case described above, the navigation apparatus 100 stores the intersection ID of the vehicle-held intersection E1 in the route guidance data storing section 1032, which corresponds to the process at Step S26 shown in FIG. 14. Further, with regard to the traveling intersection e2, the navigation apparatus 100 stores the coordinates data of the traveling intersection e2 in the route guidance data storing section 1032, which corresponds to the process at Step S30 shown in FIG. 14.

Further, in the example shown in FIG. 19, the distance minL (shown by a dotted line) from the traveling intersection e2 to the provisionally identified road R1 along a line perpendicular thereto is less than the second threshold value H2. (This corresponds to the case of a YES judgement at Step S80 shown in FIG. 16B). Further, the provisionally identified road R1 is connected to the vehicle-held intersection E1 corresponding to the traveling intersection e1. (This case corresponds to the case of a YES judgement at Step S82 shown in FIG. 16B). Furthermore, the traveling intersection e2 forms an unmatched intersection (a traveling intersection J). (This case corresponds to the case of a YES judgement at Step S84 shown in FIG. 16B). Accordingly, the coordinates of the traveling intersection e2 stored as intersection coordinates of a newly established intersection (at Step S30 shown in FIG. 14) are replaced with the coordinates of the intersection point of the perpendicular line drawn from the traveling intersection e2 to the provisionally identified Road R1. (This corresponds to the process carried out at Step S86 shown in FIG. 16B.) Further, at Step S88 shown in FIG. 16B, the vehicle-held road R1 between the identified vehicle-held intersection E1 and the intersecting point of the perpendicular line drawn from the traveling intersection e2 to the provisionally identified Road R1 is stored in the route guidance data storing section 1032.

FIG. 20 is an illustration which shows an example where a matching process for one of adjacent two traveling intersections cannot be performed successfully, and the navigation apparatus 100 does not have road data for a road directly connecting these traveling intersections. The situation in this figure schematically shows the processes carried out through Steps S32, S80 (No judgement) and S89 shown in FIGS. 14, 16A and 16B.

In this example, the matching process for the traveling intersection e1 specified by the intersection specifying data received from the navigation center 150 can be performed successfully. Further, the matching process for the traveling intersection e2 can not be performed successfully, because there is no vehicle-held intersection lying within the circle H1 centered at the traveling intersection e2. Furthermore, the distance minL from the traveling intersection e2 to the provisionally identified Road R1 along a line perpendicular thereto is greater than the second threshold value H2.

In this case, the coordinates of the traveling intersection e2 which is an unmatched traveling intersection are stored as intersection coordinates of a newly established intersection in the route guidance data storing section 1032.

Further, by executing the subroutine at Step 89 in FIG. 16B (i.e., a process for interpolating between traveling intersections), the vehicle-held intersection E1 (which corresponds to the traveling intersection e1) and the traveling intersection e2 (which corresponds to the traveling intersection J which is an unmatched intersection) are linked with a straight line, and then this straight line is stored as a road directly connecting these adjacent two intersections in the route guidance data storing section 1032.

Figure 21:
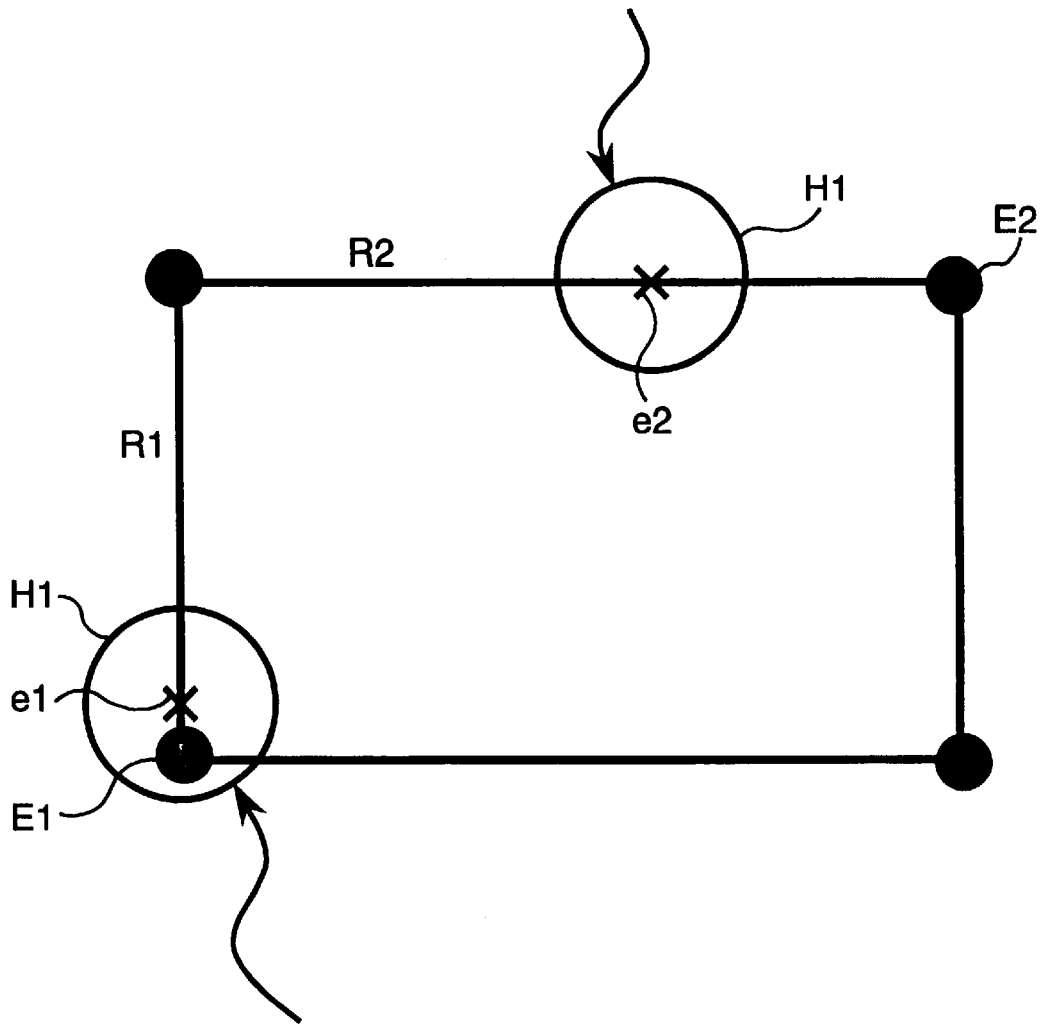
FIG. 21 is an illustration which shows an example where a matching process for one of adjacent two traveling intersections cannot be performed successfully, and the navigation apparatus does not have road data for a road connecting these traveling intersections.

FIG. 21 is an illustration which shows an example where a matching process for one of adjacent two traveling intersections cannot be performed successfully, and the navigation apparatus 100 does not have road data for a road connecting these traveling intersections. The situation in this figure schematically shows the processes carried out through Steps S32, S82 (NO judgement) and S89 in FIGS. 14, 16A and 16B.

In this example, the matching process for the traveling intersection e1 specified by the intersection specifying data received from the navigation center 150 can be performed successfully. Further, the matching process for the traveling intersection e2 can not be performed successfully, because there is no vehicle-held intersection lying within the circle H1 centered at the traveling intersection e2. Furthermore, the traveling intersection e2 lies on the provisionally identified road R2 (or in the vicinity thereof), but the provisionally identified road R2 is not connected to the vehicle-held intersection E1 (which corresponds to the traveling intersection e1 precedent to the traveling intersection e2).

In this case, by executing the subroutine at Step S89 shown in FIG. 16B (i.e., a process for interpolating between traveling intersections), the vehicle-held intersection E1 and the traveling intersection e2 (which corresponds to a traveling intersection J which is an unmatched intersection) are linked with a straight line, and then this straight line is stored as a road directly connecting these adjacent two intersections in the route guidance data storing section 1032.

Figure 22:
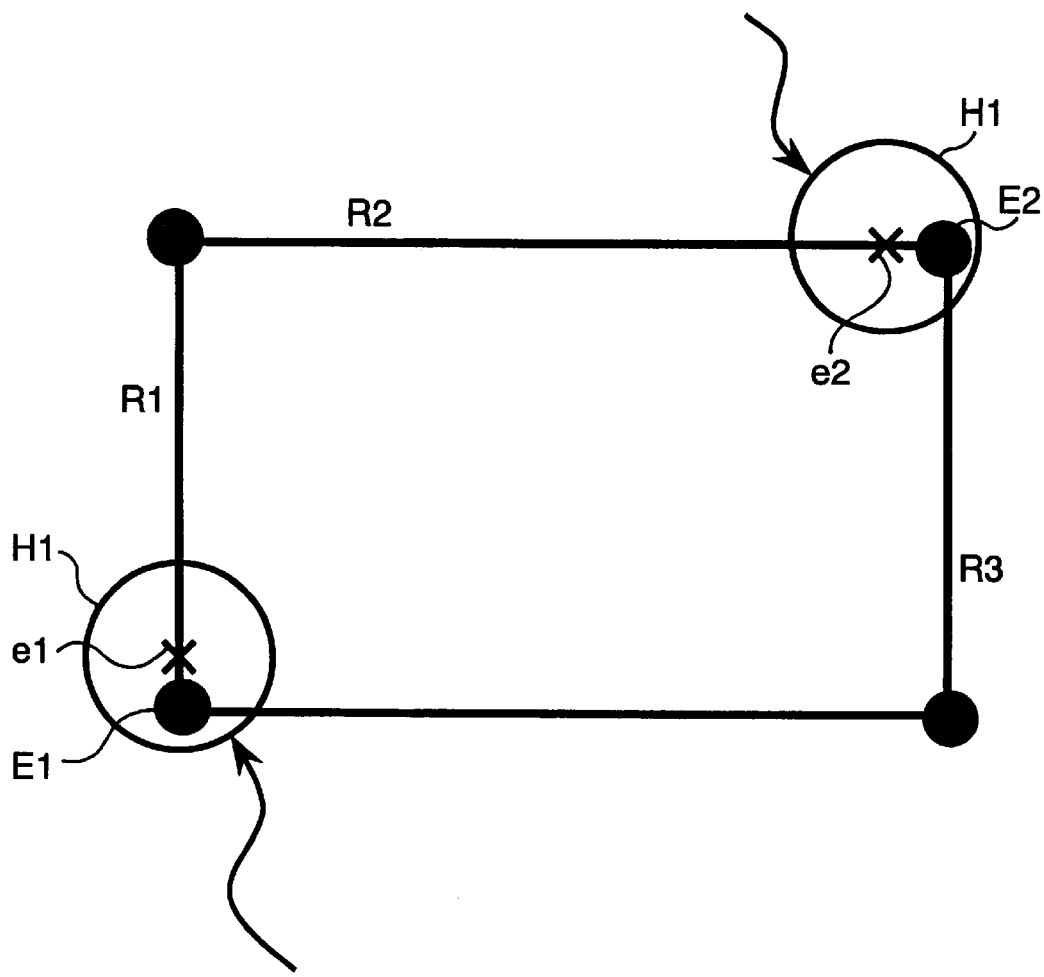
FIG. 22 is an illustration which shows an example where matching processes for adjacent two traveling intersections can be performed successfully, and the navigation apparatus does not have road data for a road connecting these traveling intersections.

FIG. 22 is an illustration which shows an example where matching processes for adjacent two traveling intersections can be performed successfully, and the navigation apparatus 100 does not have road data for a road that directly connects these traveling intersections. The situation in this figure schematically shows the processes carried out through Steps S28, S44 (NO judgement), S48 (YES judgement) and S50 in FIGS. 14 and 15.

In this examples the matching process for each of the traveling intersections e1 and e2 specified by the intersection specifying data received from the navigation center 150 can be performed successfully. Further, all the roads whose ending points are the vehicle-held intersection E1 (which corresponds to the traveling intersection e1) are not directly connected to the vehicle-held intersection E2 (which corresponds to the traveling intersection e2).

In this case, by executing the subroutine at Step S50 shown in FIG. 15 (i.e., a process for interpolating between traveling intersections), the vehicle-held intersections E1 and E2 (which correspond to the traveling intersections e1 and e2, respectively) are linked with a straight line, and then this straight line is stored as a road directly connecting these adjacent two intersections in the route guidance data storing section 1032.

Figure 23:
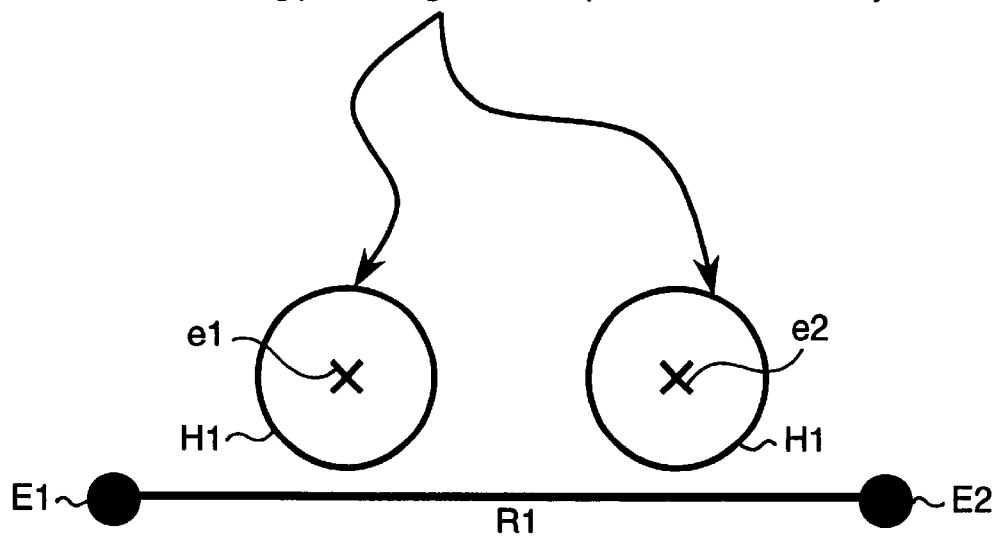
FIG. 23 is an illustration which shows an example where matching processes for adjacent two traveling intersections cannot be performed successfully.

FIG. 23 is an illustration which shows an example where matching processes for adjacent two traveling intersections cannot be performed successfully. The situation in this figure schematically shows the processes carried out through Steps S30. S32, S60 (YES judgement), S89 in FIGS. 14 and 16A.

In this example, the matching process for each of the traveling intersections e1 and e2 specified by the intersection specifying data received from the navigation center 150 cannot be performed successfully.

In this case, by executing the subroutine at Step S89 shown in FIG. 16B (i.e., a process for interpolating between traveling intersections), the traveling intersections e1 and e2 (which has been respectively established as newly-built intersections) are linked with a straight line, and then this straight line is stored as a road directly connecting these adjacent two intersections in the route guidance data storing section 1032.

According to the present invention described above, only intersection specifying data (i.e., a string of coordinate data of traveling intersections) is transmitted from the navigation center 150 to the navigation apparatus 100. This makes it possible to reduce the amount of data to be transmitted from the navigation center 150 to the navigation apparatus 100, which is particularly effective in the case where data communications are carried out utilizing the packet switching technique. Further, since the amount of data to be transmitted from the navigation center 150 to the navigation apparatus 100 is small, it is possible to shorten the communication time, which is particularly effective in the case where data communications are carried out utilizing the circuit switching technique.

Further, according to the present invention, in the case where intersection data for an intersection specified by the intersection-specifying data is not contained nor considered to be contained in the data in the navigation apparatus 100, the navigation apparatus 100 produces route guidance data (which is used for providing route guidance to the user) by establishing a newly-built intersection using coordinate data contained in the intersection specifying data. Further, in the case where road data for a road connecting adjacent two traveling intersections is not contained nor considered to be contained in the data in the navigation apparatus 100, the navigation apparatus 100 produces the route guidance data by interpolating between these two intersections (i.e., by linking the intersections with a straight line). Accordingly, even when there is a difference between the contents of the data stored in the map information storing section 1031 of the navigation apparatus 100 and the contents of the data of the map information storing section 1531 of the center apparatus 150, it is possible for the navigation apparatus 100 to reliably produce route guidance data used for providing route guidance from a departure point to a destinations Furthermore, according to the present invention described above, only coordinate data of traveling intersections received from the navigation center 150 is used to identify roads and intersections to be traveled by the vehicle. This makes it possible to perform the matching process as described above, even when there are differences in format, versions and the like between data in the navigation apparatus 100 and data in the center apparatus 150.

Next, in the following items (6)–(8), a description of a second embodiment of the navigation system according to the present invention is given.

(6) Structure of Second Embodiment of Navigation System

In the same manner as in the first embodiment described above, the second embodiment of the navigation system includes a navigation center and a plurality of navigation apparatuses.

In the same manner as in the navigation center of the first embodiment, the navigation center of the navigation system includes data receiving means, a database, database updating means, recommended route determining means for determining a recommended route, intersection specifying data producing means for producing intersection specifying data, data transmitting means. In this embodiment, the intersection specifying data produced by the intersection specifying data producing means contains at least any one of coordinate data of each intersection on the determined recommended route and data of identification number of each intersection on the determined recommended route.

Each of the navigation apparatuses of the navigation system includes route guidance data producing means for producing route guidance data, in addition to data transmitting means, data receiving means, and data storage means which are the same as in the first embodiment of the navigation system.

(7) Structure of Route Guidance Data Producing Means of Navigation Apparatus

In the second embodiment, the route guidance data producing means of the navigation apparatus includes the following means (a)–(c).

(a) Specified intersection judging means for judging whether or not intersection data for each of the intersections specified by the intersection specifying data is considered to be contained in the intersection information in the data storage means, respectively.

(b) Guide intersection extracting means for, in the case where the specified intersection judging means (a) has judged that intersection data for the intersection specified by the intersection specifying data is considered to be contained in the intersection information in the data storage means, extracting the intersection data for the intersection from the data storage means.

(c) Uncontained intersection data request means for, in the case where the specified intersection judging means (a) has judged that intersection data for the intersection specified by the intersection specifying date is not contained in the intersection information in the data storage means, obtaining intersection data for the intersection on the recommended route by requesting the navigation center to send the intersection data to the navigation apparatus.

In this connection, the route guidance data producing means of the second embodiment of the navigation apparatus is designed so as to produce the route guidance data using the intersection data extracted by the guide intersection extracting means (b), and/or the intersection data obtained by the uncontained intersection data request means (c) in addition to the road information in the data storage means.

In addition to the means (a), (b) and (c) described above, the route guidance data producing means further includes the following means (i)–(iii)

(i) First adjacent-intersections judging means for judging whether or not adjacent two intersections are included in intersections extracted by the guide intersection extracting means of the navigation apparatus.

(ii) Road-judging means for, in the case where the first adjacent-intersections judging means has judged that adjacent two intersections are included in the extracted intersections, judging whether or not road data for a road which directly connects the adjacent two intersections is contained in the road information in the data storage means of the navigation apparatus.

(iii) Uncontained road data request means for, in the case where the road-judging means has judged that road data for the road which directly connects the adjacent two intersections is not contained in the road information in the data storage means, obtaining road data for the road by requesting the navigation center to send the road data to the navigation apparatus.

In this connection, in the case where the road-judging means has judged that road data for the road which directly connects the adjacent two intersections is contained in the road information in the data storage means, the route guidance data producing means of the navigation apparatus produces the route guidance data further using the road data. In this way, it is possible to achieve the same results which were described with reference to FIG. 18. On the other hand, in the case where the road-judging means has judged that road data for the road which directly connects the adjacent two intersections is not contained in the road information in the data storage means, the route guidance data producing means of the navigation apparatus produces the route guidance data further using the road data obtained from the navigation center. In this way, it is possible to achieve the same results which were described with reference to FIG. 22.

Further, the route guidance data producing means includes the following means (iv) and (v).

(iv) Second adjacent-intersections judging means for judging whether or not an intersection adjacent to any one of intersections for which intersection data has been obtained by the uncontained intersection data request means is included in intersections extracted by the guide intersection extracting means of the navigation apparatus.

(v) Uncontained road data request means for, in the case where the second adjacent-intersections judging means has judged that an intersection adjacent to any one of the intersections for which the intersection data has been obtained by the uncontained intersection data request means is included in the extracted intersections, obtaining road data for a road which directly connects these adjacent two intersections by requesting the navigation center to send the road data to the navigation apparatus.

In this connection, in the case where the second adjacent-intersections judging means has judged that an intersection adjacent to any one of the intersections for which the intersection data has been obtained by the uncontained intersection data request means is included in the extracted intersections, the routs guidance data producing means of the navigation apparatus produces the route guidance data further using the road data obtained from the navigation center. In this way, it is possible to achieve the same results which were described with reference to FIGS. 20 and 21.

Furthermore, the route guidance data producing means includes the following means (vi) and (vii).

(vi) Third adjacent-intersections judging means for judging whether or not adjacent two intersections are included in intersections for which intersection data is obtained by the uncontained intersection data request means of the navigation apparatus.

(vii) Uncontained road data request means for, in the case where the third adjacent-intersections judging means has judged that the adjacent two intersections are included in the intersections for which intersection data is obtained by the uncontained intersection data request means, obtaining road data for a road which directly connects these adjacent two intersections by requesting the navigation center to send the road data to the navigation apparatus.

In this connection, in the case where the third adjacent-intersections judging means has judged that the adjacent two intersections are included in the intersections for which intersection data is obtained by the uncontained intersection data request means, the route guidance data producing means of the navigation apparatus produces the route guidance data further using the road data obtained from the navigation center. In this way, it is possible to achieve the same results which were described with reference to FIG. 23.

(8) Operations Performed in Second Embodiment of Navigation System

Figure 26:
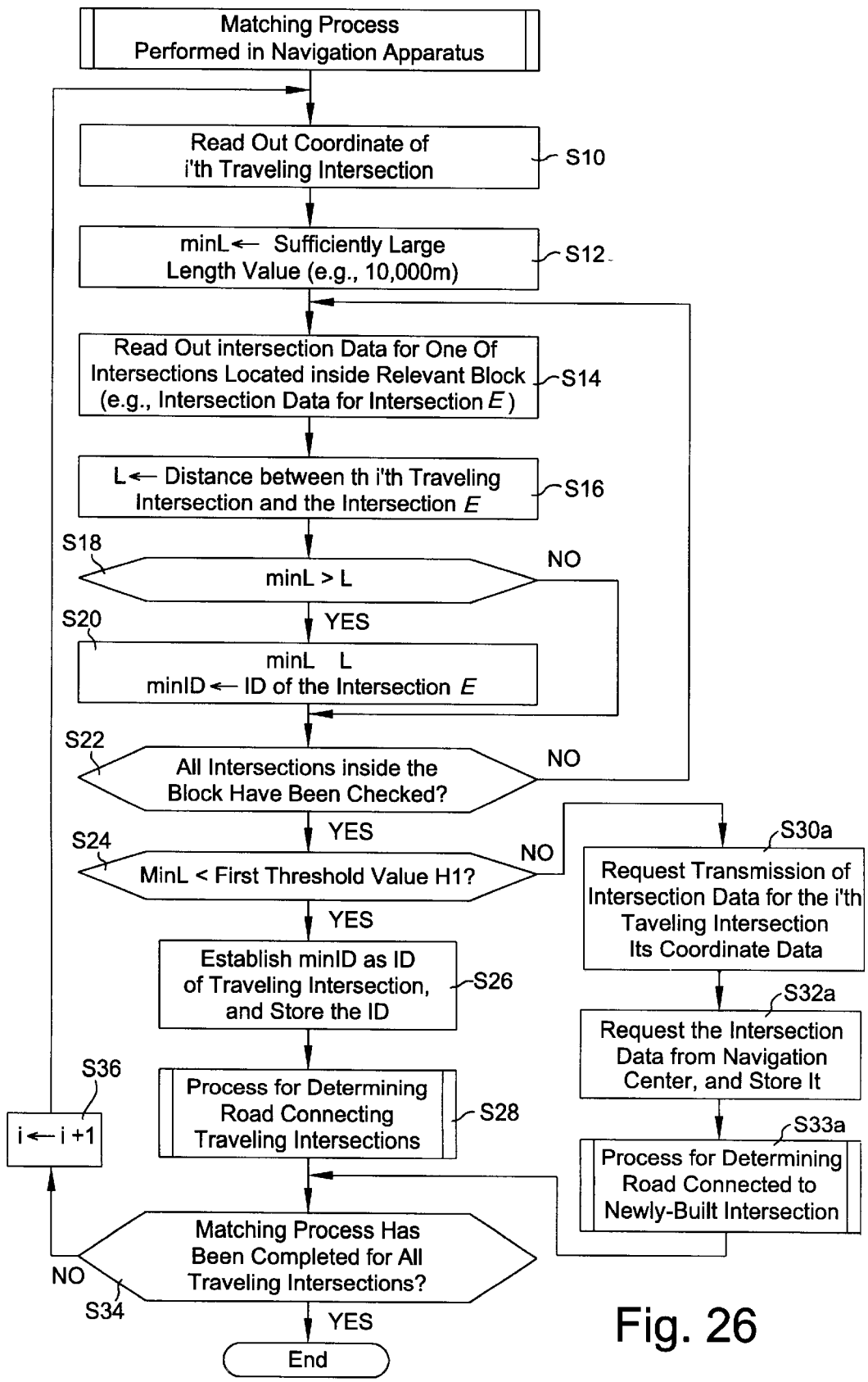
FIG. 26 is a flowchart which shows a matching process performed in the navigation apparatus of the second embodiment of the navigation system according to the present invention.
Figure 27:
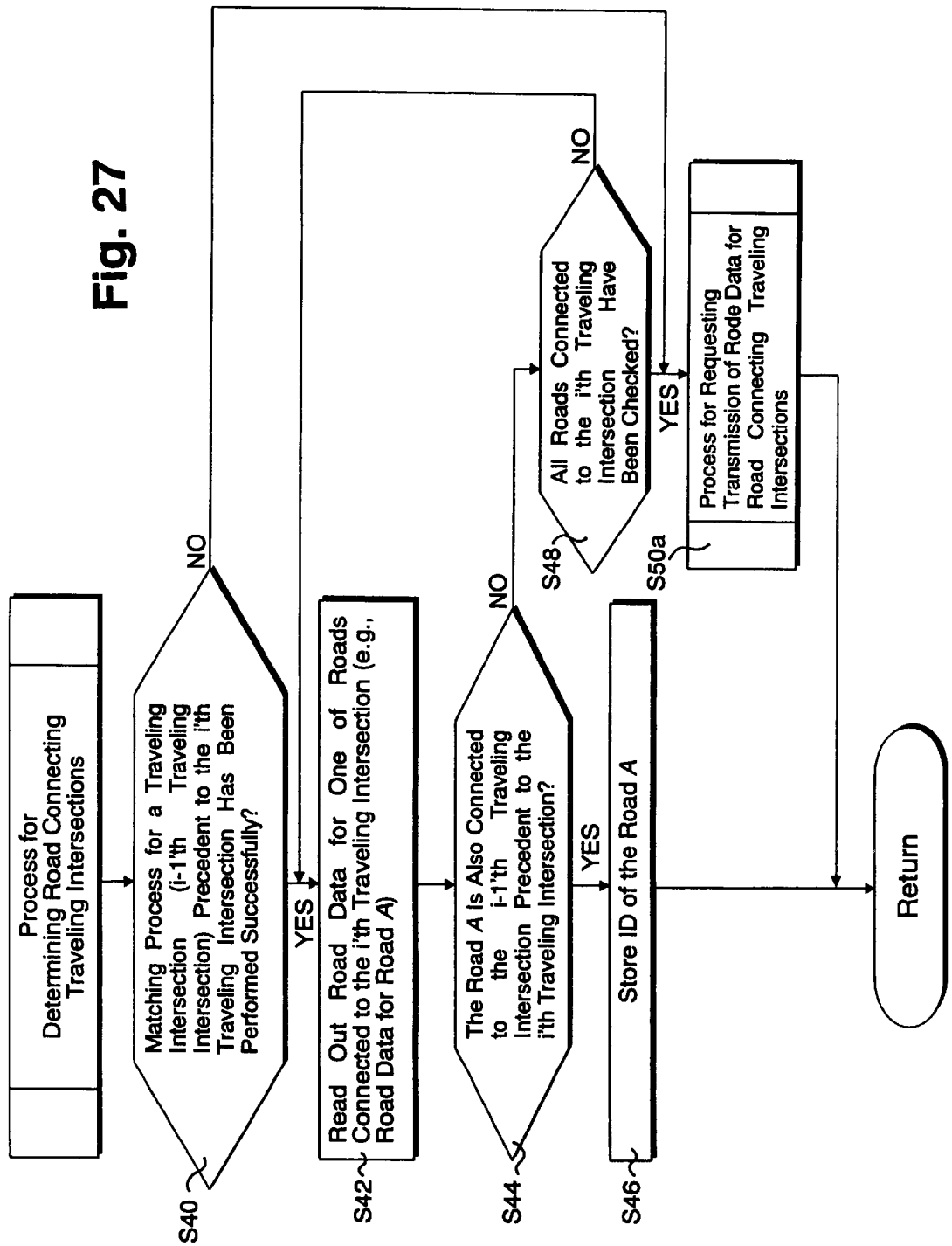
FIG. 27 is a flowchart which shows a process for determining a road connecting traveling intersections performed in the navigation apparatus of the second embodiment of the navigation system according to the present invention.
Figure 28:
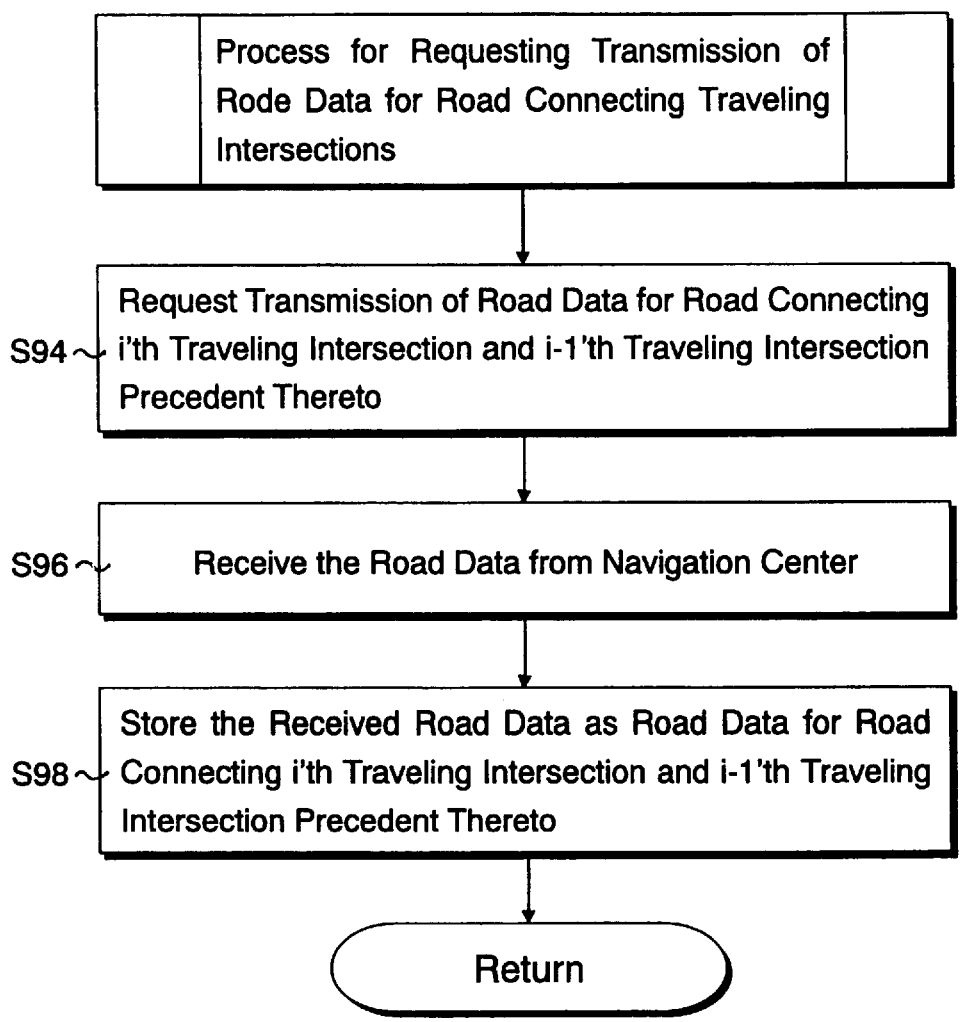
FIG. 28 is a flowchart which shows a process for requesting transmission of road data for a road connecting traveling intersections, which is performed in the navigation apparatus of the second embodiment of the navigation system according to the present invention.

Hereinafter, a description of a second embodiment of the navigation system according to the present invention is given with reference to FIGS. 26–28.

In the second embodiment of the navigation system, in the case where intersection data for a traveling intersection specified by the received intersection specifying data is not contained nor considered to be contained in the data stored in the map information storing section 1031 of the navigation apparatus 100 (i.e., a NO judgement at Step S24), the navigation apparatus 100 requests the navigation center 150 to transmit intersection data for the traveling intersection to the navigation apparatus 100 (Step S30a). Then, at Step S32a, the navigation apparatus 100 receives the intersection data from the navigation center 150, and stores the received data in the route guidance data storing section 1032. In this connection, examples of information to be contained in such intersection data transmitted from the navigation center 150 include various information needed in performing route guidance, such as image data used for providing a general image of the traveling intersection to the user, data of the intersection name, data showing whether or not the traveling intersection is provided with traffic lights, coordinates data of roads connecting the traveling intersection and a traveling intersection adjacent thereto, and the like.

Next, in the subroutine (FIG. 27) of the process for determining a road connecting traveling intersections, in the case where it is judged at Step S40 that the matching process for a traveling intersection (i–1'th traveling intersection) precedent to the i'th traveling intersection has not been performed successfully, the processor 101 of the navigation apparatus 100 executes the subroutine of the process for requesting the navigation center 150 to transmit to the navigation apparatus 100 road data for a road connecting the i'th and i−1'th traveling intersections (Step S50*a*).

In the process for requesting transmission of road data for a road connecting traveling intersections (FIG. 28), first, the navigation apparatus 100 requests navigation center 150 to transmit to the navigation apparatus 100 road data for a road connecting i'th and i−1'th traveling intersections (Step S94). After receiving the road data from the navigation center 150 (Step S96), the processor 101 of the navigation apparatus 100 stores the received road data as road data for a road connecting i'th and i−1'th traveling intersections (Step S98).

In this connection, examples of information to be contained in such road data transmitted from the navigation center 150 include various information needed in performing route guidance, such as coordinate data of the road, data showing the number of lanes on the road, data of the road name, and the like.

In the above, the first and second embodiments of the navigation system according to the present invention was described in detail. In this connection, it should be noted that the navigation system of the present invention is not limited to the embodiments described above.

For example, in the embodiments, the description was given for the case where the navigation apparatus 100 receives intersection specifying data (a string of coordinate data of each of traveling intersections) from the navigation center 150, but the present invention is not limited to this arrangement. Specifically, in the navigation system of the present invention, the navigation center 150 may be designed so as to transmit to the navigation apparatus 100 additional information in addition to such intersection specifying data.

In this regard, such additional information contains various information that will make it easier to carry out the matching process performed in the navigation apparatus 100, or detailed guidance information (such as landmark data and the like).

In particular, such additional information may include one or more of the following information (1)–(7).

(1) Coordinate data of each of roads connecting the intersections located on the determined recommended route.

(2) Data concerning the number of lanes on each of roads connecting the intersections located on the determined recommended route.

(3) Data concerning traffic restrictions on each of roads connecting the intersections located on the determined recommended route.

(4) Data concerning a geographical layout of each of roads connecting the intersections located on the determined recommended route.

(5) Data concerning facilities located around each of the intersections on the determined recommended route.

(6) Data showing which intersections in the intersections located on the determined recommended route are provided with traffic lights.

(7) Data for indicating a travelling direction toward which the user of the navigation apparatus is to be guided.

Figure 24:
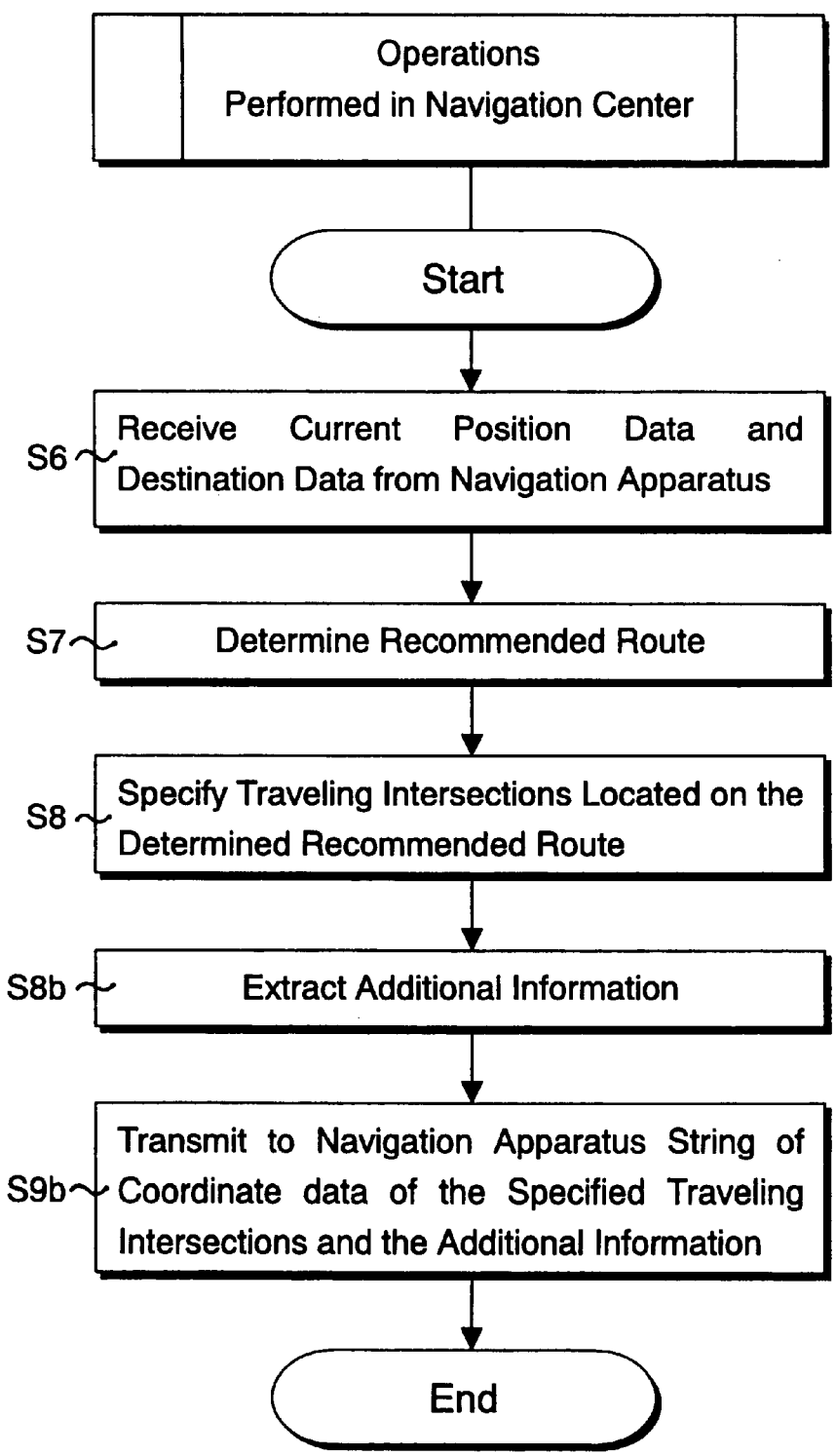
FIG. 24 is a flowchart which generally shows operations performed in the navigation center of second embodiment of the navigation system according to the present invention.

Next, FIG. 24 is a flowchart which shows operations performed in the navigation center 150 of a modification of the navigation system according to the present invention.

In this modification shown in FIG. 24, after traveling intersections located on the determined recommended route are specified, the system control section 152 of the navigation center 150 extracts additional information as described above (Step S8*b*).

Then, the system control section 152 transmits to the navigation apparatus 100 a string of the coordinate data of each of the specified traveling intersections and the extracted additional information (Step S9*b*).

In this connection, when intersection ID and road ID of the roads and intersections forming the determined recommended route are contained in such additional information, it becomes possible to omit the matching process and the road determining process which were described above with reference to FIGS. 14–17. Namely, since it is easy to identify the intersections and roads using the intersection ID and the road ID contained in the additional information, it is possible to reduce the number of processes carried out in the navigation apparatus 100.

However, if the data stored in the map information storing section 1031 of the navigation apparatus 100 and the data stored in map information storing section 1531 of the navigation center 150 have different formats and versions, there arises a case that the navigation apparatus 100 cannot identify roads and intersections using the ID information received from the navigation center 150. In such a case, the navigation apparatus 100 has to perform the processes shown in FIGS. 14–17.

Figure 25:
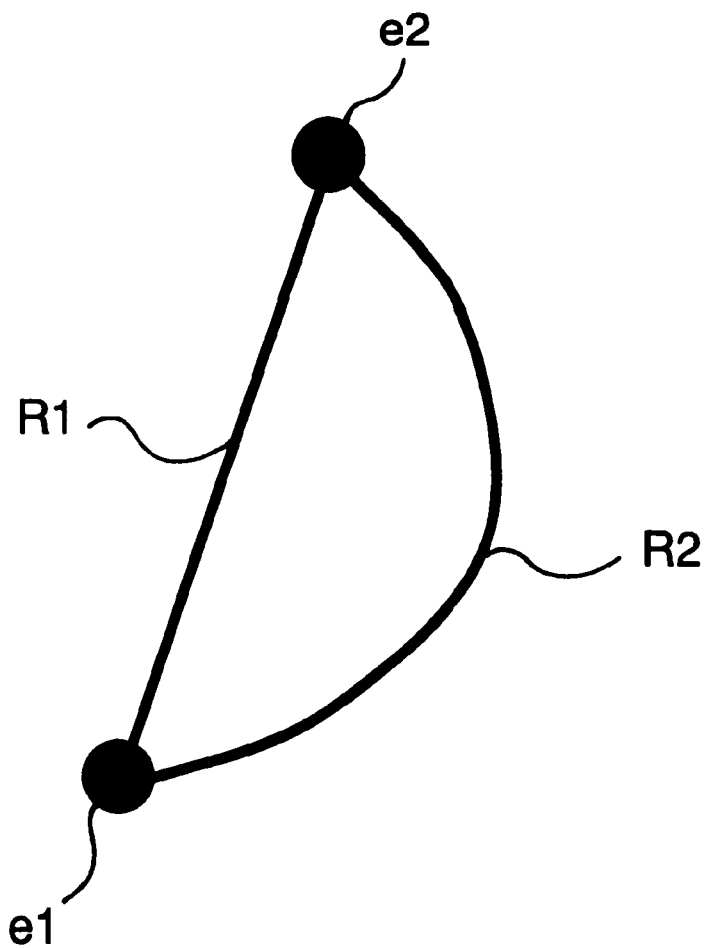
FIG. 25 is an illustration which shows an example where adjacent two intersections are directly connected with two discrete roads.

Further, when coordinate data of roads forming the determined recommended route is contained in such additional information, it becomes possible for the navigation apparatus 100 to easily identify a road to be traveled by the vehicle. Specifically, even in the situation shown in FIG. 25 (which shows an example where adjacent two traveling intersections e1 and e2 are directly connected with two discrete roads R1 and R2), the navigation apparatus 100 can easily identify a road to be traveled by the vehicle using such additional information (that is, the coordinate data of the road). Further, using the additional information containing the coordinate data of the roads, it also becomes possible for the navigation apparatus 100 to display a road having road conditions close to that of the actual road during the route guidance.

Further, instead of transmitting intersection ID and/or road ID as additional information, the navigation center 150 may transmit such ID information to the navigation apparatus 100 as intersection specification data for specifying traveling intersections.

In this case as well, it is possible to omit the matching process and the road determining process, and this makes it possible to reduce the number of processes carried out in the navigation apparatus 100. However, even in such a case, the navigation apparatus 100 has to perform the processes shown in FIGS. 14–17, when the navigation apparatus 100 cannot identify roads and intersections to be traveled by the vehicle even using the received ID information.

In the embodiments described above, a description was given for the case where a recommended route determination can also be carried out independently in the navigation apparatus 100. However, since in this invention the navigation apparatus 100 is designed to produce route guidance data using intersection specifying data received from the navigation center 150, the recommended route determining function may be omitted from the navigation apparatus 100.

Further, in the embodiments described above, the navigation apparatus 100 transmits the data of the current position and destination to the navigation center 150, and then the center apparatus 150 carries out a recommended route determining process to produce intersection specifying data for a recommended route. However, when this invention is applied to a navigation system for taxis or carriers to inform drivers of locations of passengers or places of pick-up, there is a case that it is enough for the drivers to learn only the destinations such as the locations of passengers and the places of pick-up. In such cases, the navigation system may be configured so that only the navigation center transmit intersection specifying data of the destinations to the navigation apparatuses without receiving current position data from the navigation apparatuses.

According to the present invention described above, the navigation apparatus of the navigation system can produce route guidance data (which is used for providing route guidance to a user) using intersection specifying data received from the navigation center. Further, since the navigation center is designed to transmit only such intersection specifying data (such as coordinate data of each of traveling intersections, intersection ID of each of traveling intercessions, and the like) to the navigation apparatus, it becomes possible to reduce the amount of data to be transmitted from the navigation center to the navigation apparatus.

Further, according to the present invention, even in the case where the navigation apparatus does not possess intersection data for an intersection specified by the received intersection specifying data, the navigation apparatus of the navigation system can produce route guidance data for such an intersection using the intersection specifying data.

Furthermore, according to the present invention, even in the case where the navigation apparatus does not possess road data for a road directly connecting adjacent two traveling intersections specified by the received intersection specifying data, the navigation apparatus of the navigation system can determine such a road using the intersection specifying data.

Finally, it is to be understood that many changes and additions may be made to the embodiments described above without departing from the scope and spirit of the invention as defined in the appended Claims.

What is claimed is:

1. A navigation system which includes a navigation center and a plurality of navigation apparatuses, in which data concerning a recommended route from a current position of each navigation apparatus to a destination is transmitted from the navigation center to the navigation apparatus, and then route guidance is carried out in the navigation apparatus using the data received from the navigation center, wherein the navigation center of the navigation system comprises:

data receiving means for receiving at least data concerning a destination and data concerning a current position of the navigation apparatus from the navigation apparatus using data communications;

a database which stores at least intersection information concerning intersections;

database updating means for updating each information in the database;

recommended route determining means for determining a recommended route from the current position of the navigation apparatus to the destination, the determination of the recommended route being made based on the information in the database in response to a request from the navigation apparatus;

intersection specifying data producing means for specifying intersections located on the determined recommended route based on the intersection information in the database to produce intersection specifying data for said specified intersections; and data transmitting means for transmitting at least the produced intersection specifying data to the navigation apparatus using data communications;

and wherein each navigation apparatus of the navigation system comprises:

data transmitting means for transmitting at least the current position data and the destination data to the navigation center using data communications;

data receiving means for receiving the intersection specifying data from the navigation center using data communications;

data storage means which stores at least intersection information concerning intersections and road information which includes information concerning roads connecting said intersections; and route guidance data producing means for producing route guidance data which is used for providing route guidance for the recommended route to a user of the navigation apparatus, the route guidance data being produced in accordance with the intersection specifying data received from the navigation center and the road information in the data storage means, in which said route guidance data producing means comprises:

(a) specified intersection judging means for judging whether or not intersection data for each of the intersections specified by the intersection specifying data is considered to be contained in the intersection information in the data storage means, respectively;

(b) guide intersection extracting means for, in a case where the specified intersection judging means (a) has judged that intersection data for the intersection specified by the intersection specifying data is considered to be contained in the intersection information in the data storage means, extracting the intersection data for the intersection from the data storage means; and (c) new-intersection establishing means for, in a case where the specified intersection judging means (a) has judged that intersection data for the intersection specified by the intersection specifying data is not contained in the intersection information in the data storage means, establishing the intersection as a newly-built intersection on the recommended route:

wherein the route guidance data producing means of the navigation apparatus is designed so as to produce the route guidance data using the intersection data extracted by said guide intersection extracting means (b), and/or intersection data concerning the newly-built intersection established by said new-intersection establishing means (c) in addition to the road information in the data storage means.

2. The navigation system as claimed in claim 1, wherein the intersection specifying data produced by the intersection specifying data producing means contains at least coordinate data of each intersection on the determined recommended route.

3. The navigation system as claimed in claim 1, wherein the route guidance data producing means of the navigation apparatus further comprises:

first adjacent-intersections judging means for judging whether or not adjacent two intersections are included in intersections extracted by the guide intersection extracting means (b) of the navigation apparatus; and first road-judging means for, in a case where the first adjacent-intersections judging means has judged that adjacent two intersections are included in the extracted intersections, judging whether or not road data for a road which directly connects said adjacent two intersections is contained in the road information in the data storage means of the navigation apparatus.

4. The navigation system as claimed in claim 3, wherein in a case where the first road-judging means has judged that road data for the road which directly connects the adjacent two intersections is contained in the road information in the data storage means, the route guidance data producing means of the navigation apparatus produces the route guidance data further using said road data.

5. The navigation system as claimed in claim 3, wherein in a case where the first road-judging means has judged that road data for the road which directly connects the adjacent two intersections is not contained in the road information in the data storage means, the route guidance data producing means of the navigation apparatus produces the route guidance data by interpolating between said adjacent two intersections.

6. The navigation system as claimed in claim 1, wherein the route guidance data producing means of the navigation apparatus further comprises;
    second adjacent-intersections judging means for judging whether or not an intersection adjacent to any one of newly-built intersections established by the new-intersection establishing means (c) is included in intersections extracted by the guide intersection extracting means (b) of the navigation apparatus,; and
    second road-judging means for, in a case where the second adjacent-intersections judging means has judged that an intersection adjacent to any one of the newly-built intersections established by the new-intersection establishing means (c) is included in the extracted intersections, judging whether or not road data for a road which directly connects these adjacent two intersections is contained in the road information in the data storage means of the navigation apparatus.

7. The navigation system as claimed in claim 6, wherein in a case where the second road-judging means has judged that road data for the road which directly connects the adjacent two intersections is contained in the road information in the data storage means, the route guidance data producing means of the navigation apparatus produces the route guidance data further using said road data.

8. The navigation system as claimed in claim 6, wherein in a case where the second road-judging means has judged that road data for the road which directly connects the adjacent two intersections is not contained in the road information in the data storage means, the route guidance data producing means of the navigation apparatus produces the route guidance data by interpolating between said adjacent two intersections.

9. The navigation system as claimed in claim 1, wherein the route guidance data producing means of the navigation apparatus further comprises third adjacent-intersections judging means for judging whether or not adjacent two newly-built intersections are included in newly-built intersections established by the new-intersection establishing means (c) of the navigation apparatus.

10. The navigation system as claimed in claim 9, wherein in a case where the third adjacent-intersections judging means has judged that adjacent two newly-built intersections are included in the established newly-built intersections, the route guidance data producing means of the navigation apparatus produces the route guidance data by interpolating between said adjacent two newly-built intersections.

11. The navigation system as claimed in claim 1, wherein the navigation apparatus further comprises current position measuring means for measuring its current position, the current position measuring means being designed so as to measure the current position by utilizing a global positioning system and/or an inertial navigation system.

12. The navigation system as claimed in claim 1, wherein the navigation apparatus further comprises information displaying means for displaying information with which the route guidance is provided to the user of the navigation apparatus.

13. The navigation system as claimed in claim 1, wherein the navigation apparatus further comprises voice information outputting means for outputting voice information with which the route guidance is provided to the user of the navigation apparatus.

14. The navigation system as claimed in claim 1, wherein both of the navigation center and the navigation apparatus are designed so as to perform the data communications using packet switching technique and/or circuit switching technique.

15. The navigation system as claimed in claim 1, wherein the navigation canter is designed so as to send the navigation apparatus additional information as well as the intersection specifying data, in which said additional information contains at least one of:
    coordinate data of each of roads connecting the intersections located on the determined recommended route;
    data concerning the number of lanes on each of roads connecting the intersections located on the determined recommended route;
    data concerning traffic restrictions on each of roads connecting the intersections located on the determined recommended route;
    data concerning a geographical layout of each of roads connecting the intersections located on the determined recommended route;
    data concerning facilities located around each of the intersections on the determined recommended route;
    data showing which intersections in the intersections located on the determined recommended route are provided with traffic lights; and
    data for indicating a travelling direction toward which the user of the navigation apparatus is to be guided.

16. A navigation system which includes a navigation center and a plurality of navigation apparatuses, in which data concerning a recommended route from a current position of each navigation apparatus to a destination is transmitted from the navigation center to the navigation apparatus, and then route guidance is carried out in the navigation apparatus using the data received from the navigation center,
    wherein the navigation center of the navigation system comprises;
    data receiving means for receiving at least data concerning a destination and data concerning a current position of the navigation apparatus from the navigation apparatus using data communications;
    a database which stores at least intersection information concerning intersections;
    database updating means for updating each information in the database;
    recommended route determining means for determining a recommended route from the current position of the navigation apparatus to the destination, the determination of the recommended route being made based on the information in the database in response to a request from the navigation apparatus;
    intersection specifying data producing means for specifying intersections located on the determined recommended route based on the intersection information in the database to produce intersection specifying data for said specified intersections; and data transmitting means for transmitting at least the produced intersection specifying data to the navigation apparatus using data communications;

and wherein each navigation apparatus of the navigation system comprises:

data transmitting means for transmitting at least the current position data and the destination data to the navigation center using data communications;

data receiving means for receiving the intersection specifying data from the navigation center using data communications;

data storage means which stores at least intersection information concerning intersections and road information which includes information concerning roads connecting said intersections; and route guidance data producing means for producing route guidance data which is used for providing route guidance for the recommended route to a user of the navigation apparatus, the route guidance data being produced in accordance with the intersection specifying data received from the navigation center and the road information in the data storage means, in which said route guidance data producing means comprises:

(a) specified intersection judging means for judging whether or not intersection data for each of the intersections specified by the intersection specifying data is considered to be contained in the intersection information in the data storage means respectively;

(b) guide intersection extracting means for, in a case where the specified intersection judging means (a) has judged that intersection data for the intersection specified by the intersection specifying data is considered to be contained in the intersection information in the data storage means, extracting the intersection data for the intersection from the data storage means; and (c) uncontained intersection data request means for, in a case where the specified intersection judging means (a) has judged that intersection data for the intersection specified by the intersection specifying data is not contained in the intersection information in the data storage means, obtaining intersection data for the intersection on the recommended route by requesting the navigation center to send said intersection data to the navigation apparatus;

wherein the route guidance data producing means of the navigation apparatus is designed so as to produce the route guidance data using the intersection data extracted by said guide intersection extracting means (b), and/or the intersection data obtained by the uncontained intersection data request means (c) in addition to the road information in the data storage means.

17. The navigation system as claimed in claim 16, wherein the intersection specifying data produced by the intersection specifying data producing means contains at least any one of:

coordinate data of each intersection on the determined recommended route; and data of identification number of each intersection on the determined recommended route.

18. The navigation system as claimed in claim 16, wherein the route guidance data producing means of the navigation apparatus further comprises:

first adjacent-intersections judging means for judging whether or not adjacent two intersections are included in intersections extracted by the guide intersection extracting means (b) of the navigation apparatus; and road-judging means for, in a case where the first adjacent-intersections judging means has judged that adjacent two intersections are included in the extracted intersections, judging whether or not road data for a road which directly connects said adjacent two intersections is contained in the road information in the data storage means of the navigation apparatus.

19. The navigation system as claimed in claim 18, wherein in a case where the road-judging means has judged that road data for the road which directly connects the adjacent two intersections is contained in the road information in the data storage means, the route guidance data producing means of the navigation apparatus produces the route guidance data further using said road data.

20. The navigation system as claimed in claim 18, wherein the route guidance data producing means of the navigation apparatus further comprises uncontained road data request means for, in a case where the road-judging means has judged that road data for the road which directly connects said adjacent two intersections is not contained in the road information in the data storage means, obtaining road data for said road by requesting the navigation center to send said road data to the navigation apparatus, in which the route guidance data producing means of the navigation apparatus produces the route guidance data further using the road data obtained from the navigation center.

21. The navigation system as claimed in claim 16, wherein the route guidance data producing means of the navigation apparatus further comprises second adjacent-intersections judging means for judging whether or not an intersection adjacent to any one of intersections for which intersection data has been obtained by the uncontained intersection data request means (c) is included in intersections extracted by the guide intersection extracting means (b) of the navigation apparatus.

22. The navigation system as claimed in claim 21, wherein the route guidance data producing means of the navigation apparatus further comprises uncontained road data request means for, in a case where the second adjacent-intersections judging means has judged that an intersection adjacent to any one of the intersections for which the intersection data has been obtained by the uncontained intersection data request means (c) is included in the extracted intersections, obtaining road data for a road which directly connects these adjacent two intersections by requesting the navigation center to send said road data to the navigation apparatus, in which the route guidance data producing means of the navigation apparatus produces the route guidance data further using the road data obtained from the navigation center.

23. The navigation system an claimed in claim 16, wherein the route guidance data producing means of the navigation apparatus further comprises third adjacent-intersections judging means for judging whether or not adjacent two intersections are included in intersections for which intersection data is obtained by the uncontained intersection data request means (c) of the navigation apparatus.

24. The navigation system as claimed in claim 23, wherein the route guidance data producing means of the navigation apparatus further comprises uncontained road data request means for, in a case where the third adjacent-intersections judging means has judged that the adjacent two intersections are included in the intersections for which intersection data is obtained by the uncontained intersection data request means (c), obtaining road data for a road which directly connects these adjacent two intersections by requesting the navigation center to send said road data to the navigation apparatus, in which the route guidance data producing means of the navigation apparatus produces the route guidance data further using the road data obtained from the navigation center.

25. A navigation apparatus used in a navigation system in which data concerning a recommended route from a current position of the navigation apparatus to a destination is transmitted from a navigation center to the navigation apparatus, and then route guidance is carried out in the navigation apparatus using the data received from the navigation center, the navigation center being designed so as to determine the recommended route in response to a request from the navigation apparatus, and to produce intersection specifying data for specifying intersections located on the determined recommended route, the navigation apparatus comprising:

data transmitting means for transmitting at least data concerning a current position of the navigation apparatus and data concerning a destination to the navigation center using data communications;

data receiving means for receiving at least the intersection specifying data from the navigation center using data communications;

data storage means which stores at least intersection information concerning intersections and road information which includes information concerning roads connecting said intersections; and route guidance data producing means for producing route guidance data which is used for providing route guidance for the recommended route to a user of the navigation apparatus, the route guidance data being produced in accordance with the intersection specifying data received from the navigation center and the road information in the data storage means, in which said route guidance data producing means comprises:

(a) specified intersection judging means for judging whether or not intersection data for each of the intersections specified by the intersection specifying data is considered to be contained in the intersection information in the data storage means, respectively;

(b) guide intersection extracting means for, in a case where the specified intersection judging means (a) has judged that intersection data for the intersection specified by the intersection specifying data is considered to be contained in the intersection information in the data storage means, extracting the intersection data for the intersection from the data storage means; and (c) new-intersection establishing means for, in a case where the specified intersection judging means (a) has judged that intersection data for the intersection specified by the intersection specifying data is not contained in the intersection information in the data storage means, establishing the intersection as a newly-built intersection on the recommended route;

wherein the route guidance data producing means is designed so as to produce the route guidance data using the intersection data extracted by said guide intersection extracting means (b) and/or intersection data concerning the newly-built intersection established by said new-intersection establishing means (c) in addition to the road information in the data storage means.

26. A navigation apparatus used in a navigation system in which data concerning a recommended route from a current position of the navigation apparatus to a destination is transmitted from a navigation center to the navigation apparatus, and then route guidance is carried out in the navigation apparatus using the data received from the navigation center, the navigation center being designed so as to determine the recommended route in response to a request from the navigation apparatus, and to produce intersection specifying data for specifying intersections located on the determined recommended route, the navigation apparatus comprising:

data transmitting means for transmitting at least data concerning a current position of the navigation apparatus and data concerning a destination to the navigation center using data communications;

data receiving means for receiving at least the intersection specifying data from the navigation center using data communications;

data storage means which stores at least intersection information concerning intersections and road information which includes information concerning roads connecting said intersections; and route guidance data producing means for producing route guidance data which is used for providing route guidance for the recommended route to a user of the navigation apparatus, the route guidance data being produced in accordance with the intersection specifying data received from the navigation center and the road information in the data storage means, in which said route guidance data producing means comprises:

(a) specified intersection judging means for judging whether or not intersection data for each of the intersections specified by the intersection specifying data is considered to be contained in the intersection information in the data storage means, respectively;

(b) guide intersection extracting means for, in a case where the specified intersection judging means (a) has judged that intersection data for the intersection specified by the intersection specifying data is considered to be contained in the intersection information in the data storage means, extracting the intersection data for the intersection from the data storage means; and (c) uncontained intersection data request means for, in a case where the specified intersection judging means (a) has judged that intersection data for the intersection specified by the intersection specifying data is not contained in the intersection information in the data storage means, obtaining the intersection data for the intersection on the recommended route by requesting the navigation center to send the intersection data to the navigation apparatus;

wherein the route guidance data producing means is designed so as to produce the route guidance data using the intersection data extracted by said guide intersection extracting means (b), and/or the intersection data obtained by the uncontained intersection data request means (c) in addition to the road information in the data storage means.

* * * * *